US009527577B2

(12) United States Patent
Embacher

(10) Patent No.: US 9,527,577 B2
(45) Date of Patent: Dec. 27, 2016

(54) ROTORCRAFT WITH A FUSELAGE AND AT LEAST ONE MAIN ROTOR

(71) Applicant: AIRBUS HELICOPTERS DEUTSCHLAND GMBH, Donauworth (DE)

(72) Inventor: Martin Embacher, Augsburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 3 days.

(21) Appl. No.: 14/605,097

(22) Filed: Jan. 26, 2015

(65) Prior Publication Data
US 2015/0210378 A1 Jul. 30, 2015

(30) Foreign Application Priority Data

Jan. 27, 2014 (EP) .................................. 14400004

(51) Int. Cl.
*B64C 5/16* (2006.01)
*B64C 3/38* (2006.01)
*B64C 27/04* (2006.01)
*B64C 27/82* (2006.01)

(52) U.S. Cl.
CPC ................ *B64C 5/16* (2013.01); *B64C 3/385* (2013.01); *B64C 27/04* (2013.01); *B64C 27/82* (2013.01); *B64C 2027/8236* (2013.01); *Y02T 50/145* (2013.01)

(58) Field of Classification Search
CPC ............ B64C 5/16; B64C 27/82; B64C 3/385; B64C 27/04; B64C 2027/8236
See application file for complete search history.

(56) References Cited

U.S. PATENT DOCUMENTS

| 2,414,258 | A |   | 1/1947 | Hays et al. |
|-----------|---|---|--------|-------------|
| 3,241,791 | A | * | 3/1966 | Piasecki ................ B64C 27/82 244/17.19 |
| 3,332,643 | A | * | 7/1967 | Toner ..................... B64C 27/32 244/17.21 |
| 3,430,894 | A |   | 3/1969 | Strand et al. |
| 3,717,317 | A |   | 2/1973 | Certain |
| 4,730,795 | A | * | 3/1988 | David .................... B64C 27/22 244/17.21 |

(Continued)

FOREIGN PATENT DOCUMENTS

| CA | 2659499 | 9/2009 |
| CN | 1824576 | 8/2006 |

(Continued)

OTHER PUBLICATIONS

Extended European Search Report for European Application No. 14400004.9, Completed by the European Patent Office, Dated Jun. 10, 2014, 6 Pages.

*Primary Examiner* — Valentina Xavier
(74) *Attorney, Agent, or Firm* — Brooks Kushman P.C.

(57) ABSTRACT

A rotorcraft with a fuselage and at least one main rotor, the at least one main rotor being drivable for controlling an associated pitch attitude of the rotorcraft in operation, and the fuselage being equipped with at least one passive wing-type aerodynamic device that is adapted for generating independently of the associated pitch attitude a lift force acting on the fuselage, the lift force being oriented perpendicular to an air flow that is directed in operation of the rotorcraft against the passive wing-type aerodynamic device.

20 Claims, 10 Drawing Sheets

(56) References Cited

U.S. PATENT DOCUMENTS

| | | | |
|---|---|---|---|
| 4,967,984 A | 11/1990 | Allen | |
| 5,395,073 A * | 3/1995 | Rutan | B64C 3/385 244/38 |
| 5,454,530 A | 10/1995 | Rutherford et al. | |
| 6,622,962 B1 | 9/2003 | White | |
| 6,669,137 B1 | 12/2003 | Chen | |
| 6,745,979 B1 | 6/2004 | Chen | |
| 6,863,241 B2 * | 3/2005 | Sash | B64C 3/385 244/12.4 |
| 6,923,404 B1 | 8/2005 | Liu et al. | |
| 7,510,139 B2 * | 3/2009 | Walliser | B64C 3/385 244/60 |
| 7,871,032 B2 | 1/2011 | Zhao et al. | |
| 8,376,264 B1 | 2/2013 | Hong et al. | |
| 8,505,846 B1 * | 8/2013 | Sanders, II | B64C 11/003 244/7 A |
| 8,757,536 B2 | 6/2014 | Tourn | |
| 2004/0056144 A1 | 3/2004 | Bass et al. | |
| 2004/0061025 A1 | 4/2004 | Cordy, Jr. | |
| 2004/0075017 A1 * | 4/2004 | Sash | B64C 3/385 244/10 |
| 2004/0093130 A1 | 5/2004 | Osder et al. | |
| 2004/0108410 A1 | 6/2004 | August | |
| 2005/0224633 A1 | 10/2005 | Barocela et al. | |
| 2006/0266879 A1 | 11/2006 | Svoboda, Jr. | |
| 2007/0080257 A1 | 4/2007 | Muylaert | |
| 2007/0095969 A1 | 5/2007 | Walliser | |
| 2007/0095970 A1 | 5/2007 | Richardson | |
| 2007/0290099 A1 | 12/2007 | Roberge | |
| 2008/0093500 A1 * | 4/2008 | Smith | B64C 27/82 244/17.19 |
| 2008/0135677 A1 | 6/2008 | Oleshchuk et al. | |
| 2008/0237392 A1 * | 10/2008 | Piasecki | B64C 27/26 244/6 |
| 2008/0272244 A1 * | 11/2008 | Bjornenak | B64C 3/385 244/7 R |
| 2009/0206208 A1 | 8/2009 | Kennedy et al. | |
| 2009/0250548 A1 * | 10/2009 | Nyhus | B64C 3/385 244/6 |
| 2012/0160954 A1 * | 6/2012 | Thomassey | B64C 27/82 244/17.13 |

FOREIGN PATENT DOCUMENTS

| | | |
|---|---|---|
| FR | 2067224 | 8/1971 |
| GB | 2435999 | 9/2007 |
| MC | 200107 | 2/2008 |
| WO | 03099653 | 12/2003 |
| WO | 03106259 | 12/2003 |
| WO | 2008003455 | 1/2008 |
| WO | 2010017397 | 2/2010 |

* cited by examiner

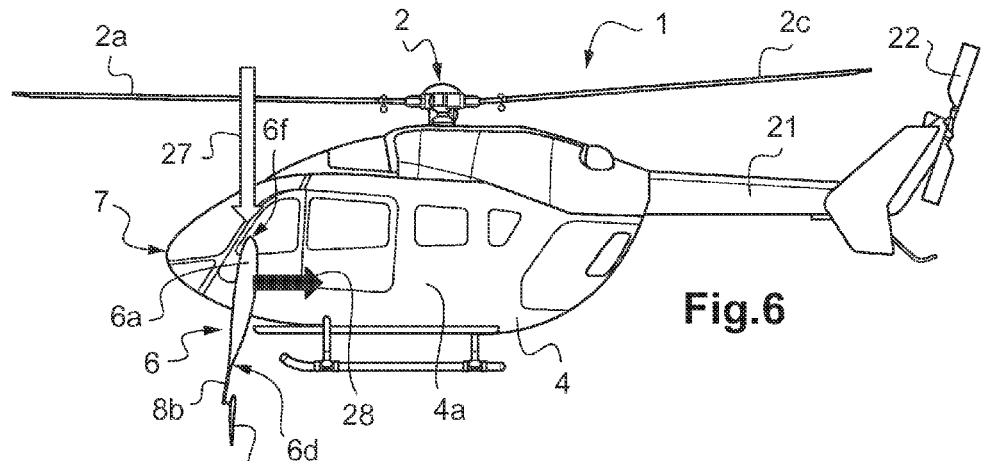
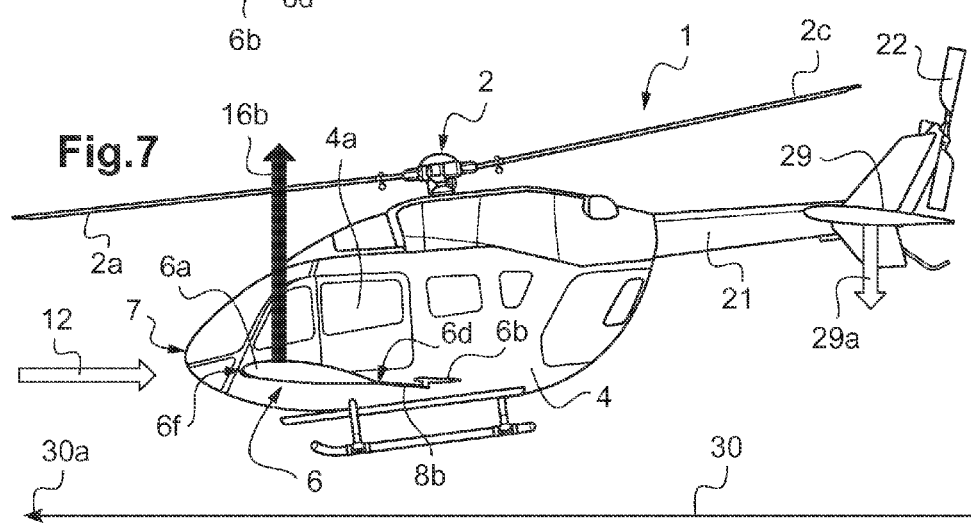
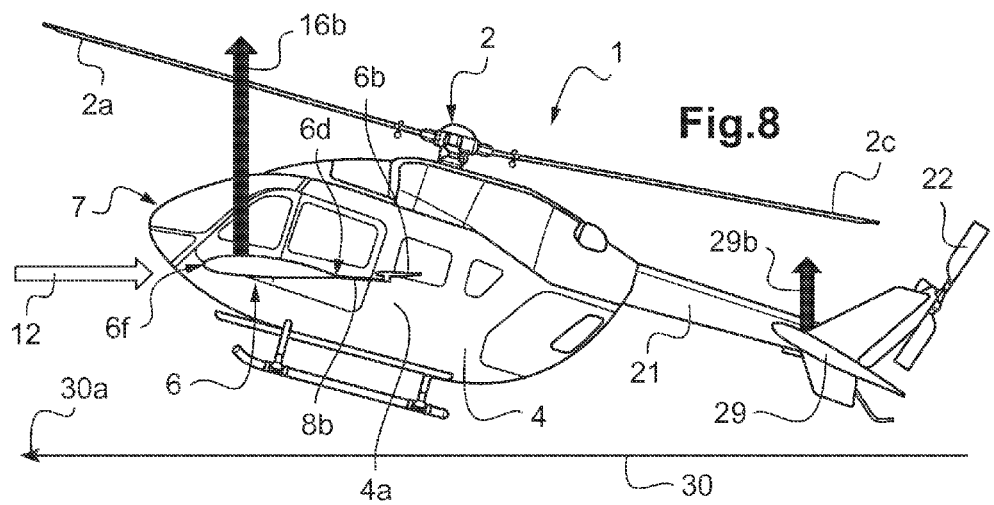

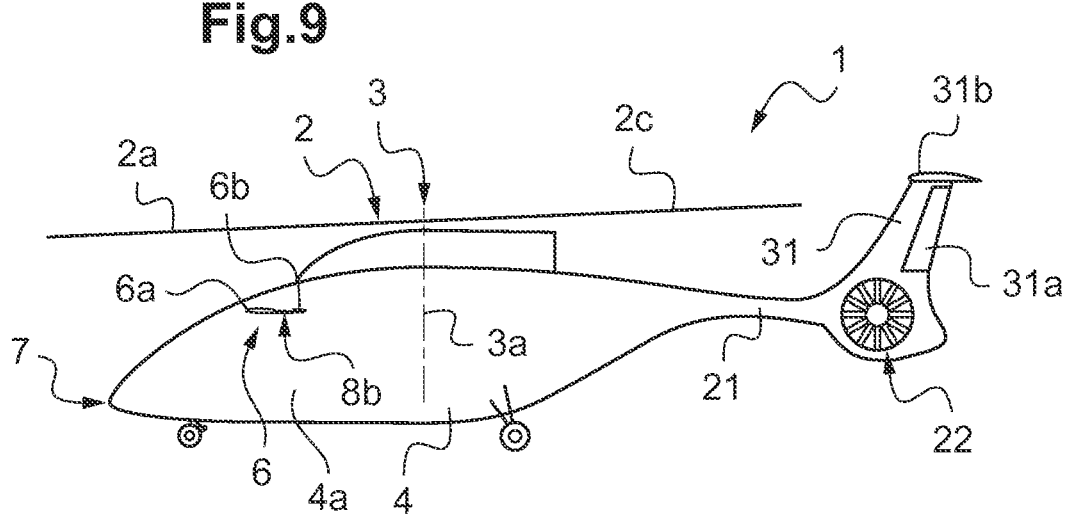
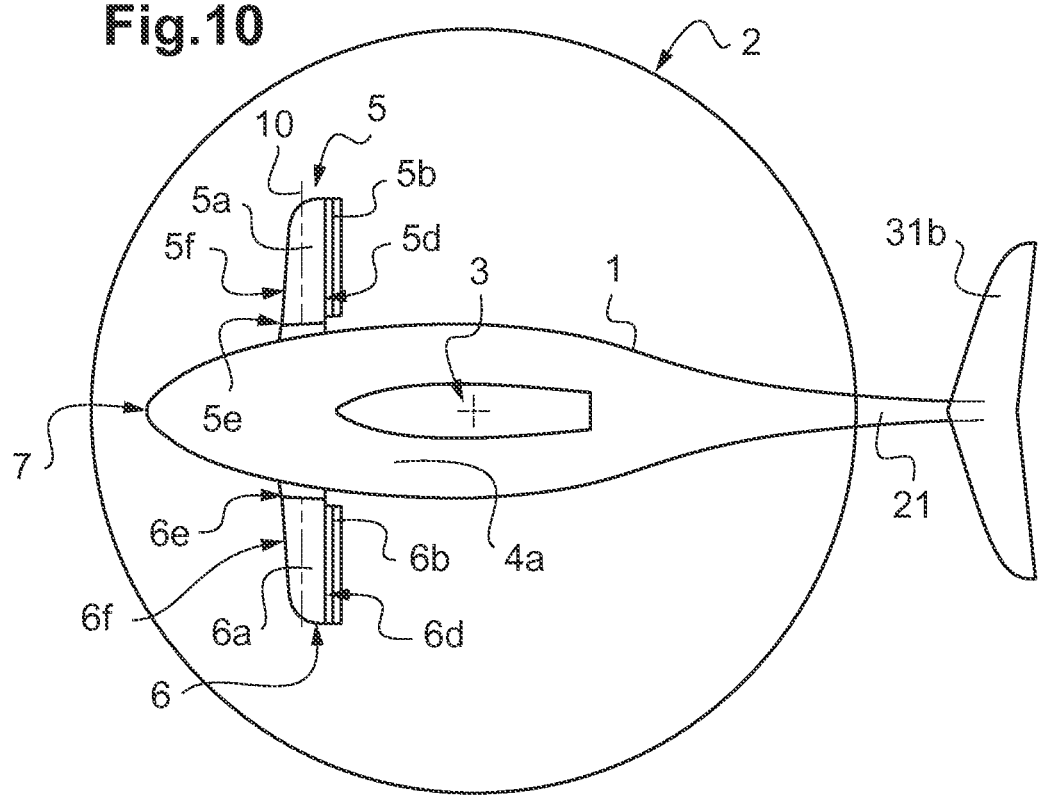

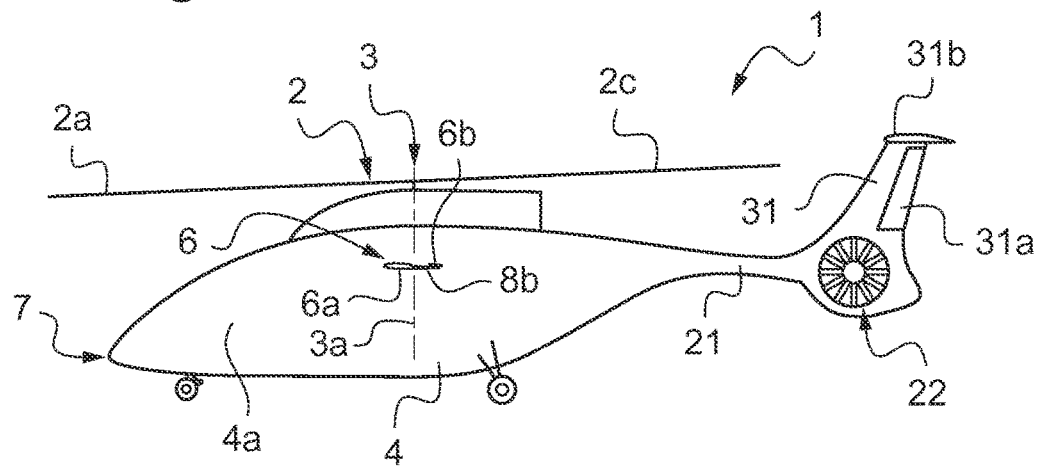
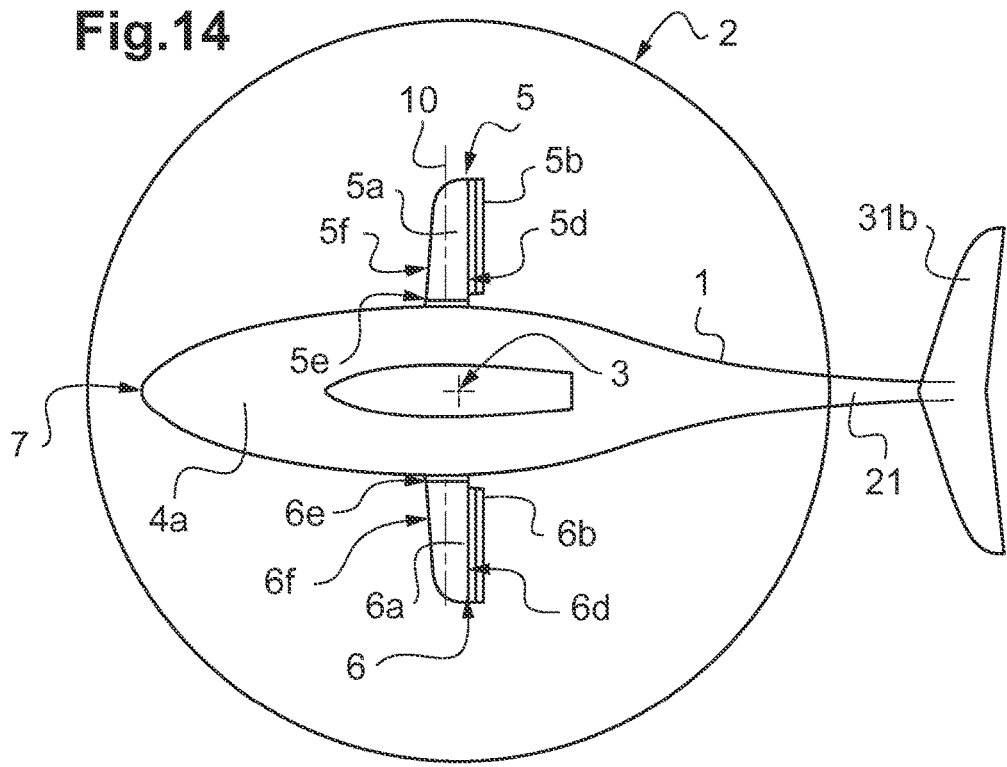

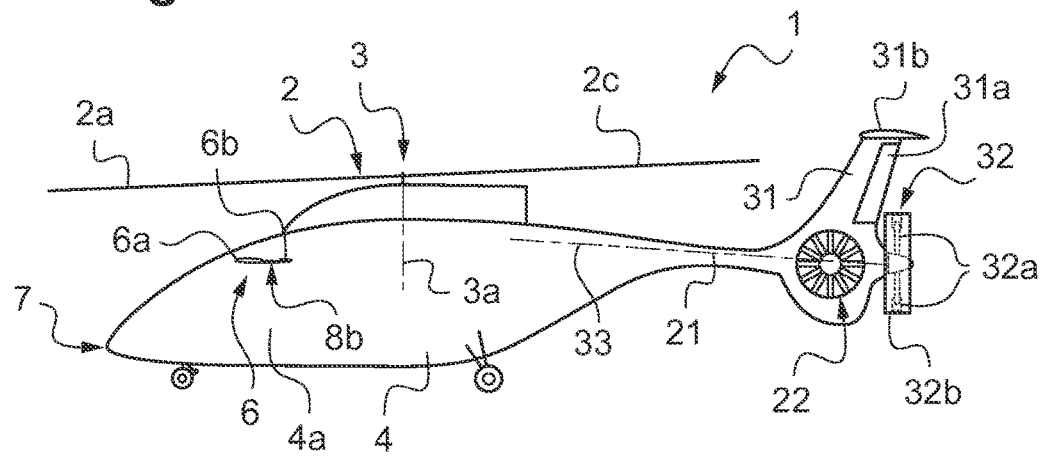
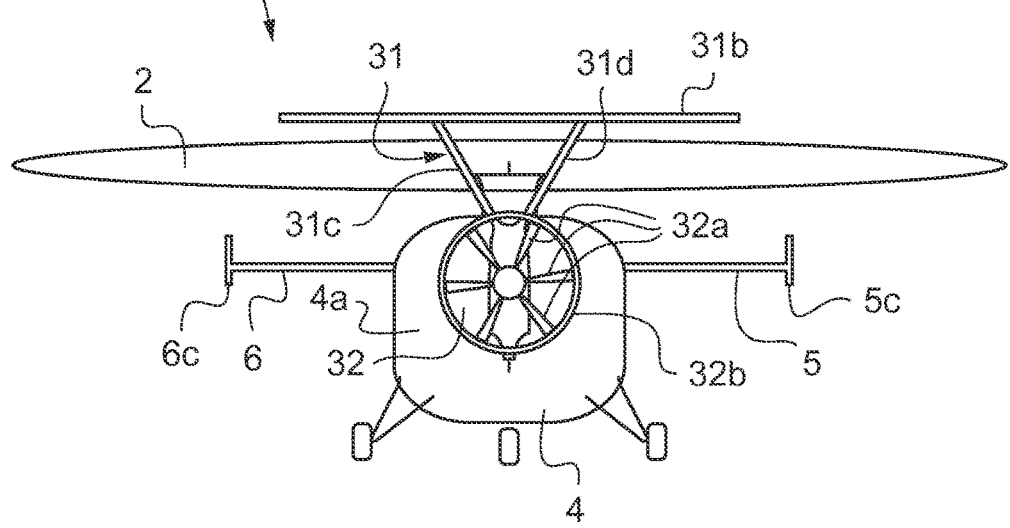

ROTORCRAFT WITH A FUSELAGE AND AT LEAST ONE MAIN ROTOR

CROSS REFERENCE TO RELATED APPLICATION

This application claims priority to European patent application No. EP 14 400004.9 filed on Jan. 27, 2014, the disclosure of which is incorporated in its entirety by reference herein.

BACKGROUND OF THE INVENTION (1) Field of the Invention

The invention is related to a rotorcraft with a fuselage and at least one main rotor, said rotorcraft comprising the features of claim 1.

(2) Description of Related Art

A rotorcraft with a single main rotor and a fuselage defining a cabin and a tail boom of the rotorcraft features in operation an inherent aerodynamic nose-down pitching moment about a rotor center of the single main rotor, with the rotor center as reference point of moments. The aerodynamic nose-down pitching moment is an "aerodynamic" load that results from a given main rotor downwash and an airflow, which is due to forward flight in operation and which increases with a corresponding velocity of a given incoming air flow. This aerodynamic load depends on a respective shape of the fuselage and on a vertical distance of a center of aerodynamic effort from the rotor center of the single main rotor.

If no measures are taken to avoid the aerodynamic nose-down pitching moment in operation, an equilibrium of moment around a pitch axis of the rotorcraft would be restored by nose-down pitching of the fuselage, until a resulting offset between a center of gravity of the rotorcraft and a respective current thrust vector and a nose-up pitching moment transferred to the fuselage via a rotor mast of the single main rotor provides counteraction. However, in this case a high moment would arise in the rotor mast in operation, if the single main rotor is embodied as a hingeless or a bearingless main rotor, and would lead to high stress and fatigue problems of the main rotor. If the single main rotor is embodied as an articulated main rotor, a larger nose-down pitching of associated fuselages can occur especially at high flight speeds, but in this case a performance penalty due to higher fuselage drag and passenger discomfort would arise.

In order to avoid the above described drawbacks, the aerodynamic nose-down pitching moment of the rotorcraft is counteracted for maintaining the fuselage in a leveled pitch attitude and to mitigate the fatigue problems with respect to the rotor mast. Therefore, a nose-up pitching moment is generated in operation for compensation of the aerodynamic nose-down pitching moment. This nose-up pitching moment increases with flight speed similarly to the aerodynamic nose-down pitching moment, which also increases with flight speed.

Generation of a nose-up pitching moment is usually achieved by employing a wing which is arranged at a position located at a rear end of the tail boom of the rotorcraft and which is generally designated as a "horizontal stabilizer". This position allows combining the task of moment generation with the task of stabilizing the pitch motion of the rotorcraft by aerodynamic damping.

If such a horizontal stabilizer is rigidly attached with a predetermined inclination to the fuselage of the rotorcraft, it is hereinafter referred to as a "fixed horizontal stabilizer". It counters the inherent aerodynamic nose-down pitching moment occurring in operation by generating a respectively required downforce in operation. This downforce is, however, detrimental in terms of performance, as it increases a respectively required rotor thrust, and in terms of stress load on the tail boom. Furthermore, the downforce generated by such a fixed horizontal stabilizer increases with forward flight speed, whereas a given rotor thrust limit decreases due to limited blade loading, particularly on the retreating rotor blades, which ultimately defines a high-speed limit of an associated flight envelope. The fixed horizontal stabilizer is employed by a vast majority of rotorcrafts having a conventional configuration with one single main rotor and an associated tail rotor, having the coaxial rotor configuration or having the intermeshing rotor configuration, which is also known as Flettner rotor system.

Alternatively, a movable horizontal stabilizer can be employed where the inclination of the horizontal stabilizer is continuously controlled by an actuator. Such movable horizontal stabilizers are often used to avoid pitch-up phenomena in low speed forward flight and only allow, as a by-product, to fine-tune the nose-up pitching moment applied to the fuselage for better trim and rotor mast moment relief. Such a movable horizontal stabilizer may be controlled by a mechanical control linkage to an underlying rotor control system. However, the movable horizontal stabilizer requires the actuator and/or the mechanical control linkage to the rotor control system, which increases weight and maintenance effort for the rotorcraft and raises questions about its reliability.

Another possibility to counter the inherent aerodynamic nose-down pitching moment occurring in operation consists in positioning a wing somewhere in front of the rotor center of the rotorcraft. A wing which is positioned somewhere in front of the rotor center of the rotorcraft is generally designated as a "canard wing" and can be adapted to generate a nose-up pitching moment by generating an upward lift force in operation, i.e. a positive lift force.

Furthermore, fixed wings installed directly below the rotor center of the rotorcraft can be designed to provide an upward lift force in operation during forward flight in order to reduce the rotor thrust and, thus, allow for higher flight speeds or improvement of power consumption. Frequently, rotorcrafts with such fixed wings are also equipped with an additional propulsion system to lower the rotor thrust even further.

However, a fixed wing that is positioned directly below the rotor center has only comparatively small influence on pitching moment equilibrium; hence the nose-up pitching moment still needs to be generated by a horizontal stabilizer through down force. Furthermore, a comparatively large download is generated on the fixed wing itself in hover or low forward flight speeds of the rotorcraft due to its position in a corresponding rotor downwash of the main rotor.

The document U.S. Pat. No. 5,454,530 describes a dual-mode high speed rotorcraft with canard wings and a high-lift tail, which includes a rotor for propulsion during low-speed flight and hover. In this rotorcraft, the canard wings and the high-lift tail function together in order to provide substantially all lift for the rotorcraft during the transition between low and high-speed flight, so that the rotor may be unloaded while starting and stopping.

However, any fixed canard wing placed in front of the center of gravity of the rotorcraft has a destabilizing effect on the pitch motion of the rotorcraft, which either prohibits its use or at least severely limits its effect. A corresponding stability margin of the helicopter pitch stability is already crossed at small areas of the canard wing and, thus, severely limits its size and, hence, its beneficial effect. Furthermore, the destabilizing effect has an adverse influence on the handling qualities of the rotorcraft. Finally, a comparatively large download on the fixed canard wing in hover or low forward flight speeds is generated due to its positioning in the rotor downwash. In order to avoid occurrence of these drawbacks, rotatable canard wings can be employed, as described in the following.

The document U.S Pat. Nos. 2007/0095970 A1 discloses an aircraft including an airframe having a fuselage extending between a nose end and a tail end with wings extending laterally from the fuselage. The aircraft includes a rotor that is rotatably mounted on the airframe including a plurality of blades. The wings are described as fixed, but an embodiment is considered where the wings may be rotated between a forward flight position and a vertical flight position, and may also be moved to intermediate flight positions. By rotating the wings into their vertical flight position, download in hover can be minimized, and by rotating them into their forward flight position, control of the pitch motion of the aircraft can be assisted, which then operates in an "airplane mode" with a stopped rotor, so that the wings may generate part of the required lift forces.

However, such rotatable wings need to be controlled by an active control system using e.g. suitable actuators to vary their incidence. But such an active control system has weight and reliability issues. Furthermore, actuation failures of such an active control system may result in instability of the rotorcraft about the pitch axis and lead to a loss of control over the rotorcraft.

Document WO 03/106259 A2 describes an aircraft comprising a boom which has opposite distal end and proximal ands, the latter being pivotally supported on the fuselage.

Document U.S. Pat. No. 2,414,258 A discloses a helicopter having three control panels located within the rotor downwash and mounted radially to the rotor mast on axis around which they can perform relatively free turning movements.

Document U.S. Pat. No. 3,430,894 A also describes a free floating wing for an aircraft, which offers inherent stability when a wind gust contacts the wing—the wing reacts to the hitting current by turning into the direction of the wing sufficiently to equalize the resulting lift.

It should be noted that at least part of the above described systems and devices for generating lift and/or the nose-up pitching moment by wing-type aerodynamic devices in order to counter the inherent aerodynamic nose-down pitching moment occurring in operation of the rotorcraft are also described in the documents U.S. Pat. No. 8,376,264 B1, WO 2010/017397 A1, US 2009/0250548 A1, CA 2 659 499 A1, US 2009/0206208 A1, MC-200107 A, WO 2008/003455 A1, US 2007/0290099 A1, CN 1824576 A, US 2008/0135677 A1, US 2007/0095969 A1, US 2007/0080257 A1, GB 0 619 167 DO, US 2006/0266879 A1, US 2005/0224633 A1, U.S. Pat. No. 6,923,404 B1, US 2004/0108410 A1, US 2004/0093130 A1, U.S. Pat. No. 6,745,979 B1, US 2004/0061025 A1, US 2004/0056144 A1, U.S. Pat. No. 6,669,137 B1, WO 2003/099653 A1 and U.S. Pat. No. 6,622,962 B1. However, all of these systems and devices have at least one of the above described drawbacks.

BRIEF SUMMARY OF THE INVENTION

It is, therefore, an object of the present invention to provide a rotorcraft comprising a wing-type aerodynamic device that overcomes the above described drawbacks.

This object is solved by a rotorcraft with a fuselage and at least one main rotor, said rotorcraft comprising the features of claim 1.

More specifically, according to the invention a rotorcraft comprises a fuselage and at least one main rotor, said rotorcraft assuming varying pitch attitudes in operation and assumes varying pitch attitudes in operation. Said fuselage is equipped with at least one passive wing-type aerodynamic device that is adapted for generating independently of said varying pitch attitudes a lift force acting on said fuselage. Said lift force is oriented perpendicular to an air flow that is directed in operation of said rotorcraft against said passive wing-type aerodynamic device.

The inventive passive wing-type aerodynamic device is preferably mounted to the fuselage for passively rotating relative thereto, i.e. it is able to rotate in a free-floating manner relative to the fuselage. More specifically, the inventive passive wing-type aerodynamic device is a passive device that requires no actuator, thereby avoiding the weight and the need for redundancy of an active system. Accordingly, a required maintenance effort for the inventive passive wing-type aerodynamic device will be comparatively low.

Advantageously, the inventive passive wing-type aerodynamic device is configured to generate an aerodynamic pitching moment at the fuselage by positive lift instead of down force. In other words, positive lift is added to the rotorcraft by the passive wing-type aerodynamic device, while the down force generated by an associated horizontal stabilizer of the rotorcraft is removed by an according adjustment of the horizontal stabilizer. A total difference in lift is a design parameter, as it depends on how far the passive wing-type aerodynamic device is positioned forward of a given center of gravity of the rotorcraft. By way of example, assuming that a longitudinal distance between the center of gravity and the passive wing-type aerodynamic device is half of the distance between the center of gravity and the associated horizontal stabilizer, this would result in a conversion of one unit of down force formerly generated by the horizontal stabilizer into approximately two units of lift generated by the passive wing-type aerodynamic device, hence a total unloading of the main rotor would amount to three units. However, it should be noted that a given magnitude of such a unit varies with an underlying type of rotorcraft.

Furthermore, with the inventive passive wing-type aerodynamic device the unloading of the main rotor advantageously increases with flight speed in operation. This unloading has its highest peak at a high-speed end of the flight envelope of the rotorcraft, where rotor thrust limits of the main rotor are approached if no such passive wing-type aerodynamic device is present.

The unloading of the main rotor is beneficial, as it reduces power consumption and/or allows expanding the flight envelope of the rotorcraft towards higher flight speeds and altitudes. Moreover, the unloading of the main rotor allows reducing a respective rotational speed of the main rotor in operation. This further amplifies gains in power consumption, as the power expended in overcoming profile drag is reduced.

Moreover, the inventive passive wing-type aerodynamic device avoids a vertical drag penalty in hover, as the passive wing-type aerodynamic device rotates in a self-actuating manner into a hover rotational orientation, i.e. it self-adjusts its rotational orientation into an approximately vertical orientation, such that it virtually generates no down force. Thereby, a rearward facing force generated by the passive wing-type aerodynamic device in its hover rotational orientation is easily counteracted by a small forward tilt of a respective rotor thrust vector, i.e. a small longitudinal control input by the pilot.

Finally, from a flight mechanics point of view, the inventive passive wing-type aerodynamic device does not alter stability characteristics of the rotorcraft about the pitch axis, i.e. it has no destabilizing effect which is associated with the above described fixed canard wings, or with the above described rotating canard wings in case of actuation failures In particular, while the horizontal stabilizer provides for stabilization and aerodynamic damping without generating a down force, the inventive passive wing-type aerodynamic device generates a lifting force and a static aerodynamic pitching moment about the rotorcraft's center of gravity which are independent of the pitch attitude of the rotorcraft and which therefore do not impact the dynamic pitch motion of the rotorcraft.

According to a preferred embodiment, said passive wing-type aerodynamic device comprises at least one wing element that is rotatable relative to said fuselage around an associated rotation axis. Said at least one wing element is adapted to self-adjust its rotational orientation relative to said fuselage by rotating in reaction to said air flow.

According to a further preferred embodiment, said at least one wing element comprises a combined neutral point designating a location, where a derivative of an aerodynamic pitching moment generated in operation of said rotorcraft is zero with respect to changes in an angle of attack encompassed between said air flow, that is directed in operation of said rotorcraft against said at least one wing element, and a chord line of said at least one wing element, wherein said associated rotation axis is arranged relative to said air flow at a position located upstream of said combined neutral point, if said aerodynamic pitching moment tends to increase said angle of attack.

According to a further preferred embodiment, said at least one wing element is at least approximately weight-balanced about said associated rotation axis, such that only aerodynamic loads occurring in operation of said rotorcraft on said at least one wing element determine said angle of attack at least substantially.

According to a further preferred embodiment, said at least one wing element is rotatably mounted to said fuselage by means of a bearing arrangement that is adapted to allow at least substantially static-friction-free rotation of said at least one wing element relative to said fuselage.

According to a further preferred embodiment, said at least one wing element is equipped with a rotary shaft, wherein said bearing arrangement comprises an intermediate bearing ring that is rotatably mounted to said rotary shaft and an outer bearing ring holding said intermediate bearing ring. Said intermediate bearing ring is adapted for continuous rotation or oscillation around said rotary shaft, and said outer bearing ring is non-rotatably mounted to said fuselage.

According to a further preferred embodiment, said bearing arrangement comprises at least one ball bearing with spherical ball races.

According to a further preferred embodiment, said at least one wing element comprises a main wing and at least one auxiliary wing. Said at least one auxiliary wing is mounted with a predetermined angle of incidence to said main wing by means of an associated wing connector. Said predetermined angle of incidence is encompassed between a chord line of said main wing and a chord line of said at least one auxiliary wing.

According to a further preferred embodiment, said predetermined angle of incidence is mechanically adjustable.

According to a further preferred embodiment, said at least one auxiliary wing is mounted at a position located upstream or downstream of said air flow that is directed in operation of said rotorcraft against said main wing.

According to a further preferred embodiment, said at least one auxiliary wing is mounted to said main wing at a predetermined distance downstream a trailing edge of said main wing.

According to a further preferred embodiment, said at least one wing element is equipped with at least one winglet-like endplate.

According to a further preferred embodiment, said at least one wing element comprises an S-shaped section profile.

According to a further preferred embodiment, said at least one wing element is embodied as a swept wing with spanwise twist, said swept wing comprising an outer wing section that is twisted nose-up in case of forward sweep, or twisted nose-down in case of rearward sweep, relative to an associated inner wing section.

According to a further preferred embodiment, said at least one wing element comprises a first wing element arranged on a first lateral rotorcraft side and a second wing element arranged on a second lateral rotorcraft side. Said first and second wing elements are adapted to operate independently or in unison. Said operation in unison is preferably realized by a mechanical linkage between two or more of said wing elements that preferably does not inhibit the rotation between said linked wing elements and said fuselage.

According to a further preferred embodiment, said first and second wing elements comprise differing wingspans.

According to a further preferred embodiment, said at least one passive wing-type aerodynamic device is provided in an area of the fuselage that is comprised between a nose of the fuselage and a rotor mast axis of the main rotor.

According to a further preferred embodiment, said main rotor is configured to be drivable with a variable rotational speed.

Preferably, the passive wing-type aerodynamic devices according to the present invention are adapted to both unload the main rotor of the rotorcraft and to generate an aerodynamic pitching moment. For a hingeless or a hinge- and bearingless rotor system, a prior-ranking design requirement is to keep a given rotor mast moment low in forward flight. In case of an articulated rotor system with a small hinge offset, the passive wing-type aerodynamic devices need to generate sufficient moment to bring the fuselage into the desired pitch attitude.

Advantageously, the positioning of the passive wing-type aerodynamic devices opens up a design space: With a given aerodynamic pitching moment requirement, the amount of lift or off-loading of the main rotor can be controlled by the choice of the positioning of the passive wing-type aerodynamic devices relative to the fuselage of the rotorcraft. Full benefit of an associated thrust reduction is then taken by additionally reducing a corresponding rotational speed of the main rotor. This reduces the power expended in overcoming a respective profile drag of the rotor blades of the main rotor.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 6 shows a side view of the rotorcraft of FIG. 1 in hover, FIG. 7 shows a side view of the rotorcraft of FIG. 1 illustrating coaction of the passive wing-type aerodynamic device of FIG. 1 and a horizontal stabilizer of the rotorcraft relative to a first pitch attitude of the rotorcraft, FIG. 8 shows a side view of the rotorcraft of FIG. 1 illustrating coaction of the passive wing-type aerodynamic device of FIG. 1 and a horizontal stabilizer of the rotorcraft relative to a second pitch attitude of the rotorcraft, FIG. 9 shows a simplified side view of the rotorcraft of FIG. 1 with an associated tail boom, FIG. 10 shows a top view of the rotorcraft according to FIG. 9, FIG. 13 shows a simplified side view of the rotorcraft of FIG. 1 having an associated tail boom, with the passive wing-type aerodynamic device of FIG. 1 positioned at a second alternative location, FIG. 14 shows a top view of the rotorcraft according to FIG. 13, FIG. 17 shows a simplified side view of the rotorcraft of FIG. 1 with a pusher propeller and the passive wing-type aerodynamic device of FIG. 1 positioned at the location according to FIG. 9, FIG. 18 shows a rear view of the rotorcraft according to FIG. 17, showing an alternative embodiment using a V-shaped fin.

DETAILED DESCRIPTION OF THE INVENTION

Figure 1:
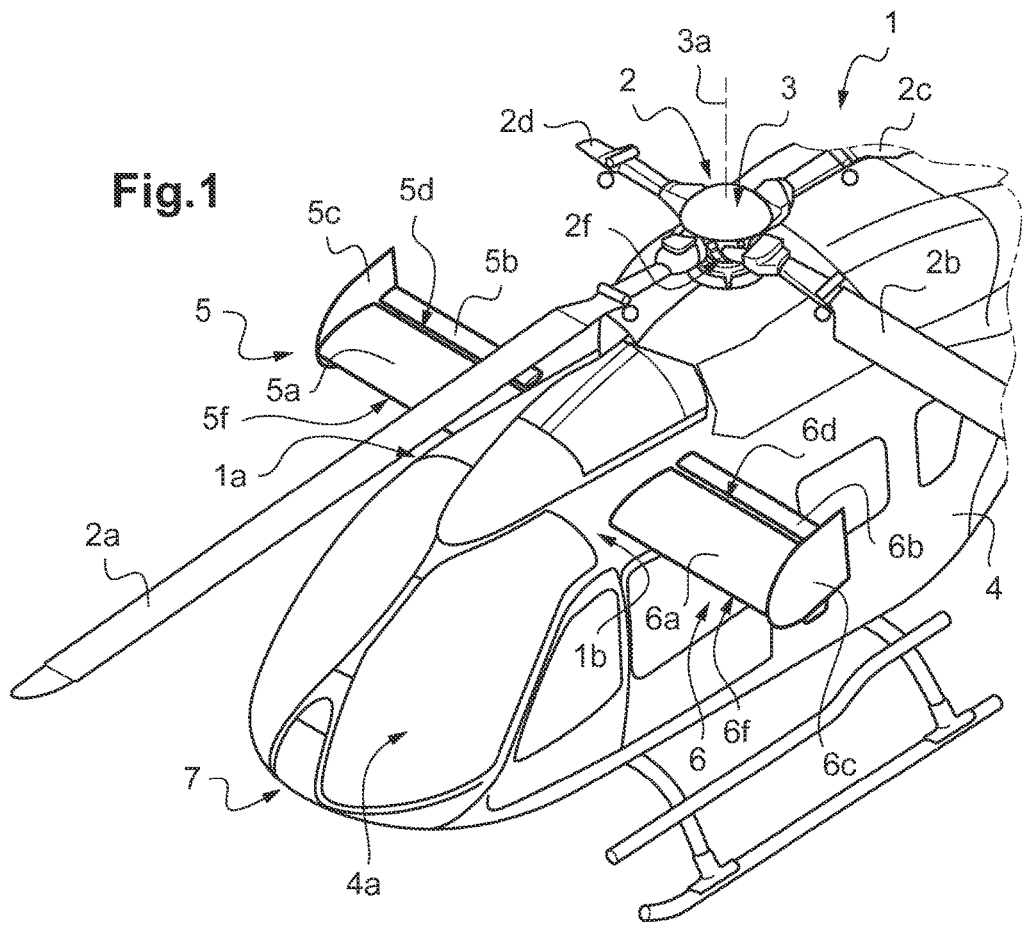
FIG. 1 shows a perspective view of a rotorcraft with a passive wing-type aerodynamic device according to the invention.

FIG. 1 shows a rotorcraft 1 with a fuselage 4 and a main rotor 2. The rotorcraft 1 is illustratively embodied as a helicopter and the main rotor 2 is illustratively embodied as a hingeless or a hinge- and bearingless multi-blade rotor having a plurality of rotor blades 2a, 2b, 2c, 2d. It should, however, be noted that the present invention is not limited to helicopters and may likewise be applied to other aircrafts that are equipped with rotary wings, independent on whether these rotary wings define articulated, hingeless or hinge- and bearingless multi-blade rotors. It should further be noted that the present invention may also be applied in cases where more than one main rotor is provided.

The main rotor 2 and, thus, the plurality of rotor blades 2a, 2b, 2c, 2d is drivable, i.e. controllable to influence an associated pitch attitude Θ of the rotorcraft 1 in operation, which assumes varying pitch attitudes in operation. Preferably, the main rotor 2 is configured to be drivable with a variable rotational speed.

Illustratively, the main rotor 2 defines a main rotor center 3 and comprises a rotor mast 2f. The rotor mast 2f has a rotor mast axis 3a that defines a rotation axis of the main rotor 2.

The fuselage 4 preferably comprises a cabin 4a defining a nose 7 of the fuselage 4, and a tail boom (21 in FIG. 4 to FIG. 19). However, for simplicity and clarity of the drawing, only the cabin 4a is illustrated in FIG. 1.

According to the invention, the fuselage 4 is equipped with at least one and, by way of example, with two passive wing-type aerodynamic devices 5, 6. These passive wing-type aerodynamic devices 5, 6 are preferably provided in an area of the fuselage 4 that is comprised between the nose 7 of the fuselage 4 and the rotor mast axis 3a of the main rotor 2. By way of example, each one of the two passive wing-type aerodynamic devices 5, 6 is arranged on an associated lateral side 1a, 1b of the fuselage 4, i.e. the rotorcraft 1. In the context of the present invention, the term "passive wing-type aerodynamic device" refers to an aerodynamic device which is adapted for passively rotating relative to the fuselage 4, i.e. for rotating in a free-floating manner relative to the fuselage 4.

The passive wing-type aerodynamic devices 5, 6 are adapted for generating independently of the associated pitch attitude Θ of the rotorcraft 1 in operation a lift force that is oriented perpendicular to an air flow directed in operation of said rotorcraft 1 against said passive wing-type aerodynamic devices 5, 6. The lift force is substantially independent of said pitch attitude θ in operation of the rotorcraft 1 and is generated for acting upwards on the fuselage 4 in order to support the operation of the rotorcraft 1 with a desired pitch attitude and mast moment, with a reduced thrust of the main rotor 4, and without a destabilizing influence on the rotorcraft's pitch motion.

Preferably, each one of the passive wing-type aerodynamic devices 5, 6 comprises at least one wing element 5a, 5b, 6a, 6b that is rotatable relative to said fuselage 4. Furthermore, each one of the passive wing-type aerodynamic devices 5, 6 can be equipped with an optional winglet-like endplate 5c, 6c. The wing elements 5a, 5b, 6a, 6b of the passive wing-type aerodynamic devices 5, 6 are preferably adapted to operate independently or in unison and may comprise differing wingspans.

By way of example, each one of the passive wing-type aerodynamic devices 5, 6 comprises a main wing 5a, 6a and at least one auxiliary wing 5b, 6b. The main wings 5a, 6a are illustrated with main wing trailing edges 5d, 6d and main wing leading edges 5f, 6f. The auxiliary wings 5b, 6b are exemplarily arranged in the area of the trailing edges 5d, 6d of the main wings 5a, 6a with a predetermined distance and can be attached thereto by means of the optional winglet-like endplates 5c, 6c.

Figure 2:
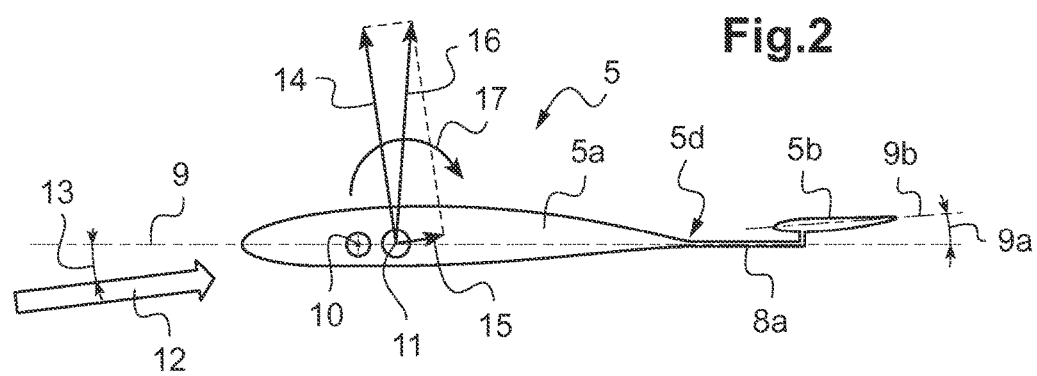
FIG. 2 shows a side view of the passive wing-type aerodynamic device of FIG. 1.

FIG. 2 shows the passive wing-type aerodynamic device 5 of FIG. 1 for explaining the functioning of the passive wing-type aerodynamic devices 5, 6 of FIG. 1 in operation of the rotorcraft 1 of FIG. 1, when an air flow 12 is directed against the passive wing-type aerodynamic devices 5, 6. However, for simplicity and brevity this functioning will only be explained with respect to the passive wing-type aerodynamic device 5 representatively for both passive wing-type aerodynamic devices 5, 6 of FIG. 1.

The passive wing-type aerodynamic device 5 comprises the main wing 5a and the auxiliary wing 5b, which is mounted with a predetermined angle of incidence 9a to the main wing 5a by means of an associated wing connector 8a, such as one or more supporting arms. The predetermined angle of incidence 9a is illustratively encompassed between a chord line 9 of the main wing 5a and a chord line 9b of the auxiliary wing 5b and can optionally be adjustable mechanically. This can be useful to adjust the amount of lift generated by the passive wing-type aerodynamic device, such as reducing an undesired lift in autorotation. The associated wing connector 8a can e.g. be embodied by the optional winglet-like endplate 5c of FIG. 1.

Preferably, the auxiliary wing 5b is mounted to the main wing 5a at a predetermined distance downstream the trailing edge 5d of the main wing 5a. Illustratively, the auxiliary wing 5b is mounted at a position located downstream of the main wing 5a relative to the air flow 12. In this configuration, the auxiliary wing 5b acts similar to a horizontal stabilizer or tail plane of an aircraft, i.e. it stabilizes a respective rotational orientation of the main wing 5a in analogy to an aircraft's pitch attitude for an angle of attack 13, which is encompassed between the air flow 12 and a chord line 9 of the main wing 5a, such that the angle of attack 13 has a pre-determined value. However, the present invention is not limited to such a downstream mounting. Instead, the auxiliary wing 5b can be mounted upstream of the main wing 5a, as described below with reference to FIG. 19. In this configuration, the auxiliary wing 5b contributes to the generation of lift in operation of the rotorcraft 1 of FIG. 1. Furthermore, a first auxiliary wing can be mounted upstream and a second auxiliary wing can be mounted downstream of the main wing 5a.

The passive wing-type aerodynamic device 5 and, thus, the main and auxiliary wings 5a, 5b, are preferably rotatable around an associated rotation axis 10 in order to self-adjust the rotational orientation of the passive wing-type aerodynamic device 5 relative to the fuselage 4 in operation of the rotorcraft 1 of FIG. 1 by rotating in reaction to the air flow 12. The air flow 12 is generally directed against the passive wing-type aerodynamic devices 5 with the angle of attack 13. In order to allow for a self-adjustment of the rotational orientation of the passive wing-type aerodynamic device 5, the passive wing-type aerodynamic device 5 is at least approximately weight-balanced about the associated rotation axis 10, such that essentially only aerodynamic loads occurring in operation of the rotorcraft 1 of FIG. 1 on the interconnected main and auxiliary wings 5a, 5b and rotational inertia of the passive wing-type aerodynamic device 5 determine the angle of attack 13, preferably such that the angle of attack 13 is maintained at the pre-determined value described above.

Illustratively, the interconnected main and auxiliary wings 5a, 5b comprise a combined neutral point 11 designating a location, where a derivative of an aerodynamic pitching moment 17 generated by the interconnected main and auxiliary wings 5a, 5b in operation of the rotorcraft 1 of FIG. 1 is zero with respect to changes in the angle of attack 13. The aerodynamic pitching moment 17 is adopted to increase the angle of attack 13, as shown in FIG. 2, and the associated rotation axis 10 is arranged relative to the air flow 12 at a position located upstream of the combined neutral point 11.

The functioning of the passive wing-type aerodynamic device 5 in operation of the rotorcraft 1 of FIG. 1 is described hereinafter, wherein a moment increasing the angle of attack 13 is designated as positive. If the main wing 5a exhibits a negative aerodynamic pitching moment about the neutral point 11, which is typically the case, the auxiliary wing 5b is used to generate a positive nose-up moment, such that the interconnected main and auxiliary wings 5a, 5b exhibit a net positive aerodynamic pitching moment 17 about the neutral point 11. If, however, the main wing 5a inherently exhibits a positive aerodynamic pitching moment about the neutral point 11, the auxiliary wing 5b can be omitted, as described below with reference to FIG. 21.

An equilibrium position of the interconnected main and auxiliary wings 5a, 5b during self-adjusting is reached, when a moment induced around the associated rotation axis 10 by a lift force 14 and a drag force 15, which are considered to act at the neutral point 11, is cancelled by the aerodynamic pitching moment 17 about the neutral point 11, thus creating an equilibrium condition. As the aerodynamic pitching moment 17 is designed to be positive, the equilibrium condition is reached at positive lift. A respective amount of lift depends, however, on the magnitude of the aerodynamic pitching moment 17, which can be influenced by the angle of incidence 9a of the auxiliary wing 5b with respect to the main wing 5a, and on a given distance between the associated rotation axis 10 and the neutral point 11.

In a first approximation, changes in a velocity V of the air flow 12 do not change the equilibrium condition, as for a typical wing section both the aerodynamic pitching moment 17 and the lift and drag forces 14, 15 as well as a corresponding total force 16 scale approximately with a current dynamic pressure q, with $q=0.5 \cdot \rho \cdot V^2$, where $\rho$ defines an air density of the air flow 12. Hence, the angle of attack 13 is independent of the velocity V of the air flow 12, and the lift force 14 generated by the passive wing-type aerodynamic device 5 is, therefore, proportional to the square of the velocity, i.e. $V^2$.

When starting from the equilibrium position in operation of the rotorcraft 1 of FIG. 1, the passive wing-type aerodynamic device 5 responds to changes in the direction of the air flow 12 as follows: if the angle of attack 13 increases, the lift force 14 at the neutral point 11 increases, while the aerodynamic pitching moment 17 of the interconnected main and auxiliary wings 5a, 5b about the neutral point 11 remains constant. A higher lift at the neutral point 11 causes a negative moment about the rotation axis 10, which thus tends to reduce the angle of attack 13 such that it is maintained at its pre-determined value. Vice versa, if the angle of attack 13 decreases, the resulting positive moment about the rotation axis 10 restores the equilibrium condition and, thus, the angle of attack 13 at its pre-determined value.

It should however be noted that, depending on an underlying wing profile of the interconnected main and auxiliary wings 5a, 5b, a repositioning of the neutral point 11 during changes of the angle of attack 13 can occur. This, however, does not cancel the functioning, i.e. the working principle described above, as long as the neutral point 11 remains behind the rotation axis 10.

It should further be noted that allowing for a mechanical adjustment of the predetermined angle of incidence 9a enables a variation of a corresponding moment generated by the auxiliary wing 5b about the neutral point 11, which allows to continuously modify the angle of attack 13 at which the main wing 5a operates, and hence the generated lift force 14. Furthermore, the lift force 14 can be cancelled accordingly in the case of an autorotation of the main rotor 2 of FIG. 1, or in hover of the rotorcraft 1 of FIG. 1 or FIG. 6. It can further be used for fine-tuning an underlying trim of the rotorcraft 1 of FIG. 1 by selecting an appropriate magnitude of the lift force 14 for every flight condition, center of gravity position and rotorcraft weight. It thus allows minimizing fuselage drag and stress in the rotor mast 2f of FIG. 1 for all flight conditions.

Figure 3:
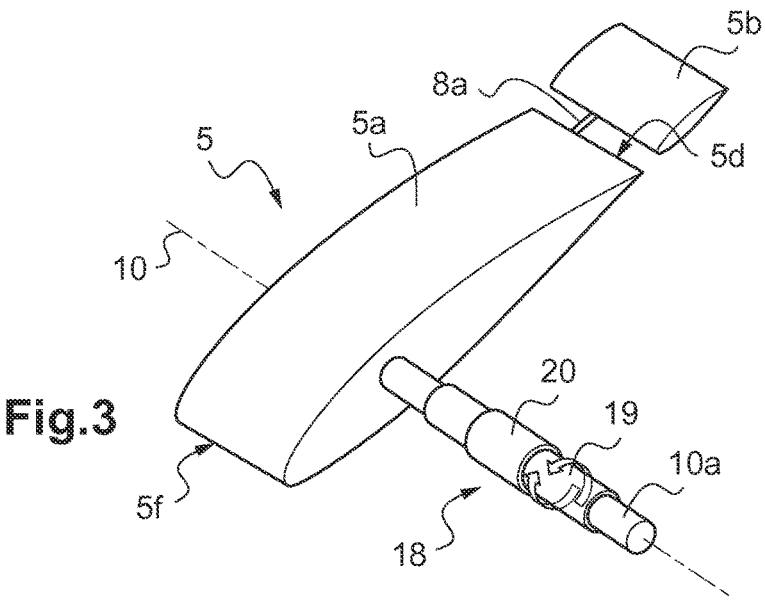
FIG. 3 shows a perspective view of the passive wing-type aerodynamic device of FIG. 1.

FIG. 3 shows the passive wing-type aerodynamic device 5 with the interconnected main and auxiliary wings 5a, 5b of FIG. 2, that are equipped with a rotary shaft 10a, which is illustratively non-rotatably attached to the main wing 5a, thereby defining the associated rotation axis 10. The rotary shaft 10a is by way of example provided with a bearing arrangement 18 for rotatably mounting of the interconnected main and auxiliary wings 5a, 5b to the fuselage 4 of FIG. 1. This bearing arrangement 18 is adapted to allow at least substantially static-friction-free rotation of the interconnected main and auxiliary wings 5a, 5b relative to the fuselage 4, i.e. rotation with no or only a minimized amount of static friction.

It should be noted that the substantially static-friction-free rotation of the passive wing-type aerodynamic device about a rotation axis 10, which is fixed relative to the fuselage, is the functional feature comprised by the invention, and that the bearing arrangement shown in FIG. 3 is an exemplary embodiment. An alternative embodiment can be conceived by implementing at least one rotational bearing between the passive wing-type aerodynamic device and a non-rotating shaft fixed to the fuselage.

The bearing arrangement 18 defines a rotational joint, through which the lift and drag forces 14, 15 of FIG. 2, or the total force 16 of FIG. 2, are transferred to the fuselage 4 of FIG. 1 such that they act on the fuselage 4 of FIG. 1 through the rotational joint. Virtually, no moment is transferred to the fuselage 4 of FIG. 1, as the bearing arrangement 18 allows rotation of the main and auxiliary wings 5a, 5b around the associated rotation axis 10 preferably without and at least substantially without friction.

Illustratively, the bearing arrangement 18 comprises an intermediate bearing ring 19 that is rotatably mounted to the rotary shaft 10a and an outer bearing ring 20 holding the intermediate bearing ring 19. The intermediate bearing ring 19 is adapted for continuous rotation or oscillation around the rotary shaft 10a. The outer bearing ring 20 is non-rotatably mounted to the fuselage 4 of FIG. 1.

In case of continuous rotation of the intermediate bearing ring 19, its rotational speed has to be higher than a maximum rotational speed of the rotary shaft 10a. In case of an oscillation or dithering of the intermediate bearing ring 19, e.g. by using a suitable dither mechanism, high frequency and amplitude are beneficial to minimize time intervals at which the rotational speeds of the intermediate bearing ring 19 and the rotary shaft 10a are close. Therein, failure of the dither mechanism is not critical as it will not block rotational motion of the main and auxiliary wings 5a, 5b. Nevertheless, continuous rotation or oscillation of the intermediate bearing ring 19 around the rotary shaft 10a ensures that the intermediate bearing ring 19 is always in motion relative to the outer bearing ring 20 and the rotary shaft 10a, so that no static friction arises. Thus, any change of pitching moment at the interconnected main and auxiliary wings 5a, 5b, and in particular very small moment changes below a predetermined sticking friction limit of a bearing arrangement not featuring an intermediate ring, will result in a self-readjustment of the rotational orientation of the main and auxiliary wings 5a, 5b.

It should be noted that the bearing arrangement 18 comprising the intermediate bearing ring 19 and the outer bearing ring 20 is only described for purposes of illustration and not for limiting the invention accordingly. Instead, alternative bearing arrangements can be employed, such as a bearing arrangement that comprises at least one ball bearing with spherical ball races, as long as they are suitable to permit rotation of the interconnected main and auxiliary wings 5a, 5b with minimized static friction, i.e. minimized stick friction. This is necessary as the interconnected main and auxiliary wings 5a, 5b should preferably respond to any change in the angle of attack 13 of the air flow 12 of FIG. 2, such that the angle of attack 13 of FIG. 2 can be maintained at its pre-determined value, so that the lift does not become dependent on the associated pitch attitude Θ of the rotorcraft 1 of FIG. 1. Use of a bearing arrangement that comprises at least one ball bearing with spherical ball races can be advantageous as it may allow tilting of the rotation axis 10a and realization of a so-called self-aligning bearing, which may be necessary in order to cope with a possible bending of the rotation axis 10a.

It should be noted, that for the different tasks associated with a horizontal stabilizer and with the passive wing-type aerodynamic device, namely the task of generating a positive aerodynamic damping and a restoring/stabilizing moment and the task of providing static nose-up moment and lift, different design parameters are relevant. Both tasks depend on size and aspect ratio of the interconnected main and auxiliary wings 5a, 5b and of the horizontal stabilizer, and their distances to the rotor center 3 of FIG. 1, but only the latter task depends also on the choice of the angle of attack 13 or an associated lift coefficient at which they operate. In contrast to the horizontal stabilizer, the interconnected main and auxiliary wings 5a, 5b can be designed to generate a required lift and static pitch-up moment at a relatively high angle of attack 13.

Figure 4:
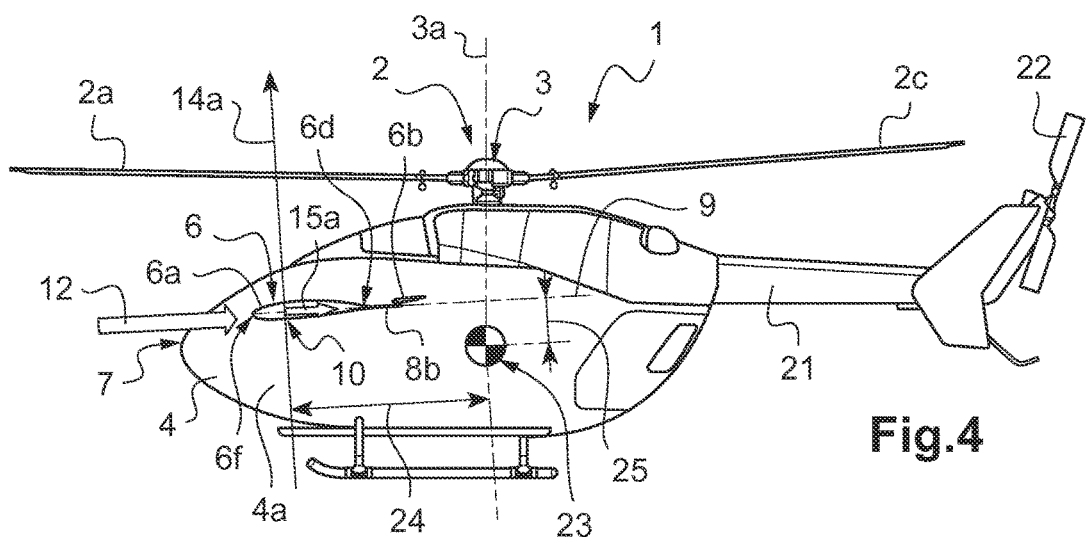
FIG. 4 shows a first side view of the rotorcraft of FIG. 1 in an exemplary forward flight of the rotorcraft.

FIG. 4 shows the rotorcraft 1 with the main rotor 2 and the fuselage 4 of FIG. 1, which now illustratively comprises in addition to the cabin 4a a tail boom 21, which is provided with a tail rotor 22. FIG. 4 illustrates in more detail loads that are transferred in operation of the rotorcraft 1 during forward flight from the passive wing-type aerodynamic device 6 of FIG. 1 having the main and auxiliary wings 6a, 6b, which are by way of example interconnected by means of a wing connector 8b, to the fuselage 4. The interconnected main and auxiliary wings 6a, 6b are illustrated in their forward flight rotational orientation. It should, however, be noted that the passive wing-type aerodynamic device 5 of FIG. 1 similarly transfers loads to the fuselage 4, but for simplicity and brevity in the following only reference to the passive wing-type aerodynamic device 6 is made.

In general, the interconnected main and auxiliary wings 6a, 6b generate the lift and drag forces 14, 15 illustrated in FIG. 2 in operation of the rotorcraft 1, which are transferred to the fuselage 4, whereby a pitching moment about a respective center of gravity 23 of the rotorcraft 1 is generated. By way of example, associated lift and drag forces that are transferred to the fuselage 4 are designated with the reference numbers 14a, 15a. A respective magnitude M of the generated pitching moment about the rotorcraft's center of gravity 23 depends for a given configuration of the interconnected main and auxiliary wings 6a, 6b on a selected mounting position thereof on the fuselage 4, i.e. of a selected position of an associated rotation axis of the interconnected main and auxiliary wings 6a, 6b on the fuselage 4, which corresponds to the associated rotation axis 10 of FIG. 2.

More specifically, in the case of cruise forward flight of the rotorcraft 1, the air flow 12 of FIG. 2 is directed generally approximately horizontally. Thus, the magnitude M of the generated pitching moment mainly depends on a respective magnitude L of the transferred lift force 14a, and on a length of a lift force moment arm 24, i.e. a distance $d_{lift}$ between a line of action of the transferred lift force 14a passing through the associated rotation axis 10 and the center of gravity 23. In this case, the magnitude M of the generated pitching moment can be determined approximately as $M = L \cdot d_{lift}$.

Furthermore, depending on a selected vertical position of the interconnected main and auxiliary wings 6a, 6b in relation to the center of gravity 23, a drag induced moment having a magnitude $M_{drag}$ could also arise. More specifically, if a given line of action of the transferred drag force 15a, does not pass through the center of gravity 23, but in a distance $d_{drag}$ thereto, where $d_{drag}$ defines a length of a given drag force moment arm 25, the magnitude $M_{drag}$ of the drag induced moment can be determined as $M_{drag} = D \cdot d_{drag}$, where D represents a respective magnitude of the transferred drag force 15a.

Figure 5:
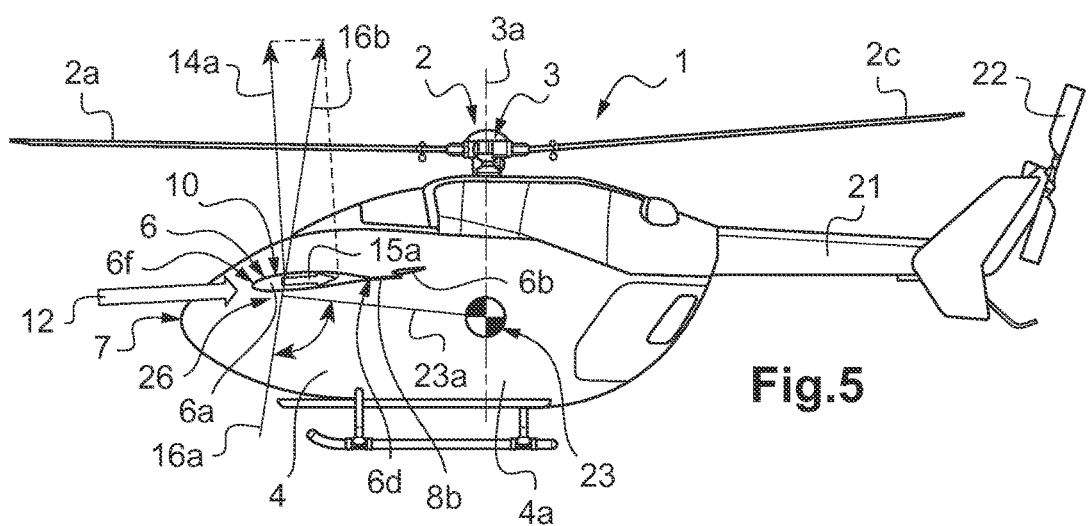
FIG. 5 shows a second side view of the rotorcraft of FIG. 1 in an exemplary forward flight of the rotorcraft.

FIG. 5 shows the rotorcraft 1 with the main rotor 2 and the fuselage 4 of FIG. 4 in order to illustrate determination of an optimized mounting position 26 of the passive wing-type device 6, i.e. the interconnected main and auxiliary wings 6a, 6b of FIG. 4, on the fuselage 4 with respect to a minimum momentum change of the generated pitching moment about the center of gravity 23 of FIG. 4. The interconnected main and auxiliary wings 6a, 6b are again subjected to the air flow 12 of FIG. 2 in operation of the rotorcraft 1 during forward flight.

Assuming that a corresponding velocity vector of the air flow 12 remains constant in magnitude and orientation in space when a change of the associated pitch attitude Θ of the rotorcraft 1 occurs, and further assuming that an angular velocity dΘ/dt of the change of the associated pitch attitude Θ is negligible, the direction of a transferred total force 16b defined by the transferred lift and drag forces 14a, 15a of FIG. 4 equally remains fixed in space. Therefore, this transferred total force 16b tilts with respect to the rotorcraft 1, i.e. the fuselage 4, by an identical amount than the change of the associated pitch attitude Θ, as described below with reference to FIG. 7 and FIG. 8.

Depending on a selected mounting position of the interconnected main and auxiliary wings 6a, 6b to the fuselage 4, a given distance 23a between a line of action 16a of the transferred total force 16b and the center of gravity 23 may have varying magnitudes. In the shown configuration with the interconnected main and auxiliary wings 6a, 6b positioned close to the optimal mounting position 26, a corresponding relative distance change of the given distance 23a can be small compared to the given distance 23a itself. For the optimal mounting position 26, it may become as small as $(1-\cos(\Delta\Theta))$, i.e. it vanishes for $\Delta\Theta \rightarrow 0$. Therefore, only a negligible minor change in pitching moment about the center of gravity 23 may occur and the aerodynamic pitching moment generated by the passively rotating interconnected main and auxiliary wings 6a, 6b can, thus, be considered as being independent of the associated pitch attitude Θ of the rotorcraft 1. In other words, the interconnected main and auxiliary wings 6a, 6b have no destabilizing effect on the pitch attitude dynamics of the rotorcraft 1, which is mainly due to the passively rotating main and auxiliary wings 6a, 6b that generate an at least substantially constant lift independently of the associated pitch attitude Θ of the rotorcraft 1.

On the basis of these assumptions, the optimized mounting position 26 can be determined as a position where the corresponding relative distance change of the given distance 23a becomes $(1-\cos(\Delta\Theta))$, i.e. where it reduces to a second order effect. This is achieved, for a given inflow direction of the air flow 12, for all positions on a line which passes through the center of gravity 23 and which is perpendicular to the line of action 16a of the transferred total force 16b in an unperturbed pitch attitude $\Theta_{trim, \, design \, point}$ of the rotorcraft 1. This line, which passes the center of gravity 23, is illustratively represented by the distance 23a and hereinafter referred to as the "gravity center line 23a", for simplicity.

If the interconnected main and auxiliary wings 6a, 6b are positioned above the gravity center line 23a, as in the illustrated embodiment, a moment behavior that is favorable for static pitch attitude stability is achieved within a certain range about an unperturbed pitch attitude angle $\Theta_{trim, \, design \, point}$ of the rotorcraft 1. More specifically, a corresponding aerodynamic nose-up pitching moment generated by the main and auxiliary wings 6a, 6b reduces at a greater nose-up pitch attitude of the rotorcraft 1 when a corresponding distance between the line of action 16a of the transferred total force 16b and the center of gravity 23 becomes smaller, and vice versa. Hence, a static moment counters pitch attitude changes of the rotorcraft 1 in analogy to the functioning of a horizontal stabilizer provided at the tail boom 21 of FIG. 4. Nevertheless, this remains an effect having a comparatively small magnitude.

However, in order to improve aerodynamic damping against pitch attitude changes, i.e. to generate an aerodynamic pitching moment about the center of gravity 23 that depends on the angular velocity dΘ/dt of a given pitch attitude change of the rotorcraft 1, a positioning of the interconnected main and auxiliary wings 6a, 6b below the gravity center line 23a is preferred. In this case, during a nose-up pitching motion of the rotorcraft 1 and a corresponding upward motion of the interconnected main and auxiliary wings 6a, 6b, an incoming air flow at the interconnected main and auxiliary wings 6a, 6b comes—in FIG. 5—comparatively more from above and is, thus, more directed downwards onto the interconnected main and auxiliary wings 6a, 6b. As a result, the transferred total force 16b will tilt rearward in space.

This rearward tilt of the line of action 16a of the transferred total force 16b reduces the distance of the line of action 16a of the transferred total force 16b to the center of gravity 23, as the interconnected main and auxiliary wings 6a, 6b are positioned below the gravity center line 23a. As a consequence, an aerodynamic nose-up pitching moment generated by the interconnected main and auxiliary wings 6a, 6b about the center of gravity 23 is reduced and appears as a damping effect, since this effect depends on the angular velocity dΘ/dt. In contrast, during a nose-down pitching motion the aerodynamic nose-up pitching moment would be increased depending on the angular velocity dΘ/dt.

As a consequence, the interconnected main and auxiliary wings 6a, 6b may arbitrarily be positioned relative to the fuselage 4 depending on a desired influence on the associated pitch attitude of the rotorcraft 1. This possibility of arbitrary positioning can be exploited by a designer to improve static stability or damping of the rotorcraft 1.

FIG. 6 shows the rotorcraft 1 with the main rotor 2 and the fuselage 4 of FIG. 4 in order to illustrate functioning of the passive wing-type aerodynamic device 6, i.e. the interconnected main and auxiliary wings 6a, 6b of FIG. 4, in operation of the rotorcraft 1 during hover. In this case, the interconnected main and auxiliary wings 6a, 6b are at least essentially subjected to a rotor downwash generated by the main rotor 2, which is illustratively represented as an air flow 27.

In response to the air flow 27, the interconnected main and auxiliary wings 6a, 6b passively rotate from their forward flight rotational orientation of FIG. 4 into their hover rotational orientation, wherein the main wing leading edge 6f of the main wing 6a points upwards, i.e. in the direction of the rotor blades 2a, 2b, 2c, 2d of FIG. 1. Accordingly, a hover lift force 28 is generated, which acts towards the rear of the rotorcraft 1. As a generated hover drag force, which is directed downwards in the direction of the air flow 27, only amounts to a comparatively small download, illustration of this hover drag force was omitted for clarity and simplicity of the drawings.

FIG. 7 shows the rotorcraft 1 with the main rotor 2 and the fuselage 4 of FIG. 4 in order to illustrate functioning of the passive wing-type aerodynamic device 6, i.e. the interconnected main and auxiliary wings 6a, 6b of FIG. 4, in operation of the rotorcraft 1 during forward flight upon occurrence of a first pitch attitude change of the rotorcraft 1. The rotorcraft 1 now illustratively comprises a horizontal stabilizer 29 positioned at a tail end of the tail boom 21 of FIG. 4, which is configured to provide for stability and damping of pitch attitude changes of the rotorcraft. However, it should be noted that the horizontal stabilizer 29 should also be provided in all previously described embodiments and has only be omitted until now for simplicity and clarity of the drawings and ease and brevity of the description.

In FIG. 7, illustratively a nose-down pitching perturbation of the rotorcraft 1 occurs during the forward flight in a direction 30a relative to a horizontal level 30. In this case, the horizontal stabilizer 29 generates a downward aerodynamic force 29a which counters the nose-down pitching motion. This allows re-adjusting the associated pitch attitude, i.e. re-establishing an equilibrium pitch attitude of the rotorcraft 1 due to the special functioning mentioned above of the passive wing-type aerodynamic device 6, which essentially generates a constant lift and pitching moment about the center of gravity 23 nearly independent of the pitch attitude.

FIG. 8 shows the rotorcraft 1 with the main rotor 2 and the fuselage 4 of FIG. 7 in order to illustrate functioning of the passive wing-type aerodynamic device 6, i.e. the interconnected main and auxiliary wings 6a, 6b of FIG. 4, in operation of the rotorcraft 1 during forward flight upon occurrence of a second pitch attitude change of the rotorcraft 1. In contrast to FIG. 7, illustratively a nose-up pitching perturbation of the rotorcraft 1 occurs in FIG. 8 during the forward flight in the direction 30a relative to the horizontal level 30. In this case, the horizontal stabilizer 29 of FIG. 7 generates an upward aerodynamic force 29b which counters the nose-up pitching motion. This allows re-adjusting the associated pitch attitude, i.e. re-establishing the equilibrium pitch attitude of the rotorcraft 1 due to the special functioning mentioned above of the passive wing-type aerodynamic device 6, which essentially generates a constant lift and pitching moment about the center of gravity 23 nearly independent of the pitch attitude.

FIG. 9 shows the rotorcraft 1 of FIG. 4 in a different embodiment with the passive wing-type aerodynamic device 6, i.e. the interconnected main and auxiliary wings 6a, 6b of FIG. 4, for further illustrating its positioning relative to the fuselage 4 of FIG. 4. As already described above, the interconnected main and auxiliary wings 6a, 6b are positioned between the nose 7 of the fuselage and the rotor mast axis 3a.

Illustratively, the rotorcraft 1 further comprises a fin 31 with a rudder 31a and a tail wing 31b in the form of a T-tail provided at the tail boom 21 of the fuselage 4. The rudder 31a is preferably adapted to provide for enhanced directional control and for optimized yaw trim of the rotorcraft 1. Preferably, the rudder 31a can be deflected to large angles to reduce a given lateral drag of the fin 31 in sideward flight.

The tail wing 31b may be adjustable in its inclination and can overtake the functioning of the horizontal stabilizer 29 of FIG. 7 and FIG. 8, so that illustration of such a horizontal stabilizer was omitted for simplicity of the drawings. More specifically, the tail wing 31b may act as an additional lifting surface. The fin 31 is further provided with the tail rotor 22 for providing antitorque, which is by way of example embodied as a Fenestron® tail rotor.

FIG. 10 shows the rotorcraft 1 of FIG. 9 with the passive wing-type aerodynamic devices 5, 6 having their main wings 5a, 6a connected to the fuselage 4 of FIG. 9 at associated planar boundaries 5e, 6e. These planar boundaries 5e, 6e define reference planes that spatially separate the interconnected main and auxiliary wings 5a, 5b, 6a, 6b from the fuselage 4.

Figure 11:
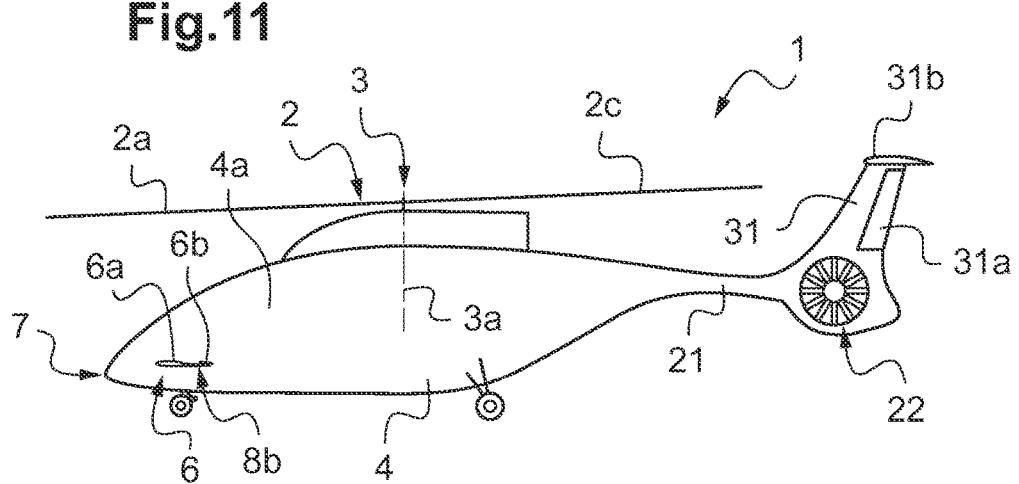
FIG. 11 shows a simplified side view of the rotorcraft of FIG. 1 having an associated tail boom, with the passive wing-type aerodynamic device of FIG. 1 positioned at a first alternative location.

FIG. 11 shows the rotorcraft 1 of FIG. 9 with the passive wing-type aerodynamic device 6, i.e. the interconnected main and auxiliary wings 6a, 6b of FIG. 4, which are according to an alternative embodiment again positioned between the nose 7 of the fuselage and the rotor mast axis 3a, but closer to the nose 7.

Figure 12:
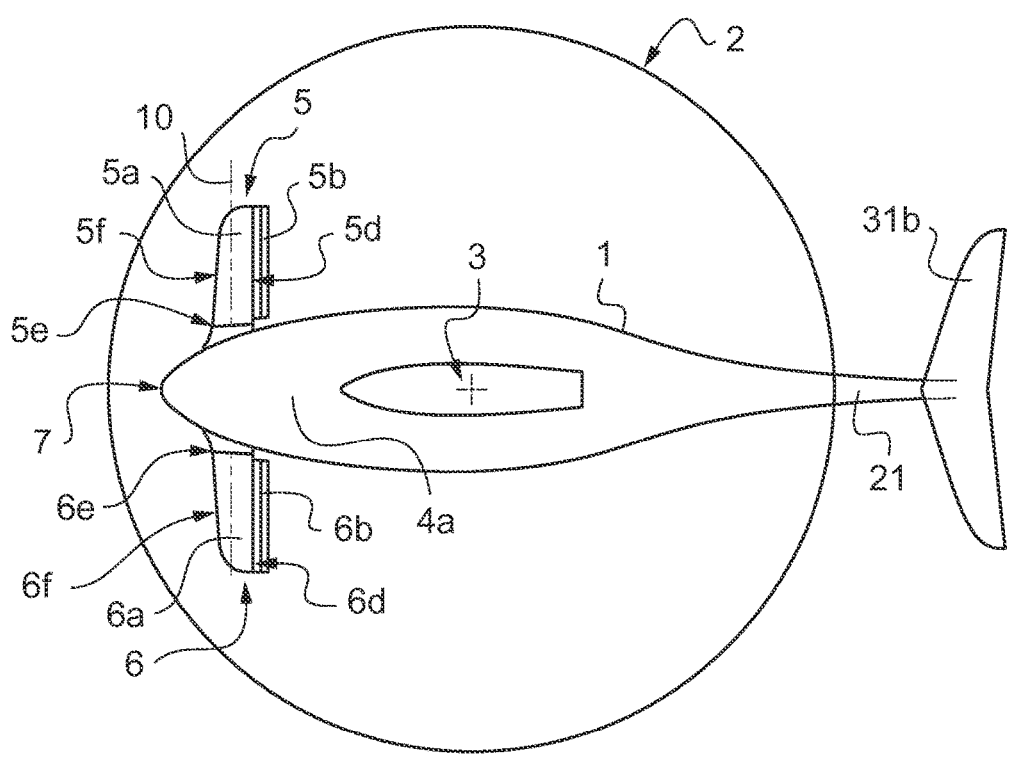
FIG. 12 shows a top view of the rotorcraft according to FIG. 11.

FIG. 12 shows the rotorcraft 1 of FIG. 11 with the passive wing-type aerodynamic devices 5, 6 having their main wings 5a, 6a connected to the fuselage 4 of FIG. 9 at the associated planar boundaries 5e, 6e, which are now embodied close to the nose 7 of the fuselage 4.

FIG. 13 shows the rotorcraft 1 of FIG. 9 with the passive wing-type aerodynamic device 6, i.e. the interconnected main and auxiliary wings 6a, 6b of FIG. 4, which are according to a further alternative embodiment positioned approximately on the rotor mast axis 3a.

FIG. 14 shows the rotorcraft 1 of FIG. 13 with the passive wing-type aerodynamic devices 5, 6 having their main wings 5a, 6a connected to the fuselage 4 of FIG. 9 at the associated planar boundaries 5e, 6e, which are now positioned on the fuselage 4 in the region of the rotor mast axis 3a. In this case, lift can be generated without exerting a pitching moment about the center of gravity (23 in FIG. 4) on the fuselage 4.

Figure 15:
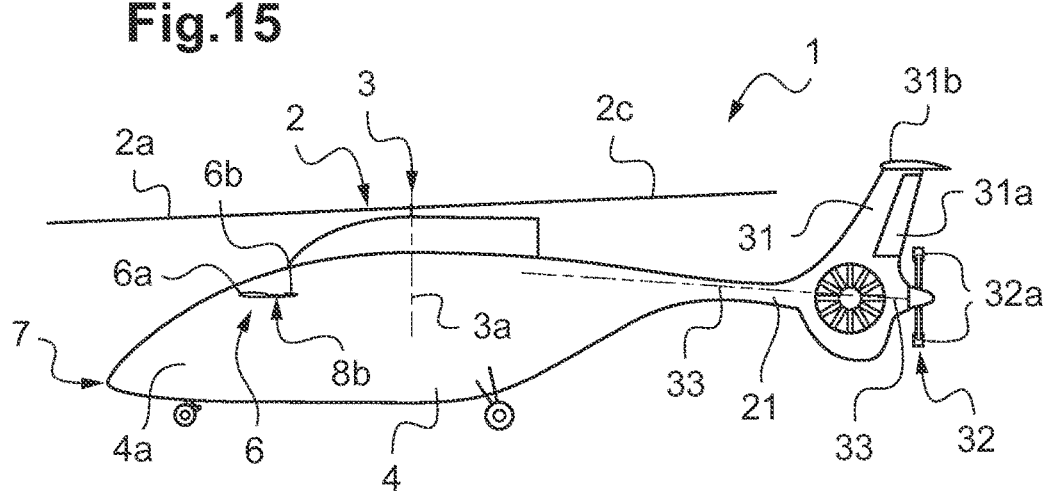
FIG. 15 shows a simplified side view of the rotorcraft of FIG. 1 having an associated tail boom supporting a propeller, with the passive wing-type aerodynamic device of FIG. 1 positioned at the location according to FIG. 9.

FIG. 15 shows the rotorcraft 1 of FIG. 9 with the passive wing-type aerodynamic device 6, i.e. the interconnected main and auxiliary wings 6a, 6b of FIG. 4, which are again positioned like in FIG. 9. However, in contrast to FIG. 9, the rotorcraft 1 is now provided with a propeller 32 having a plurality of propeller blades 32a for providing forward thrust, such that the main rotor 2 is preferably only used to provide lift. This further reduces a required main rotor thrust and results in a more economical operation of the main rotor 2. In particular, during forward flight of the rotorcraft 1, the main rotor 2 can be switched into an autorotation mode, where it obtains energy and is driven by the air flow 12 of FIG. 4. The propeller 32 is illustratively embodied as a so-called open pusher propeller.

The propeller 32 is preferably driven by an associated drive train 33, which also drives the tail rotor 22. This allows to reduce a required mechanical complexity for arrangement of the tail rotor 22 and the propeller 32 at the tail boom 21. The plurality of propeller blades 32a is preferably of variable incidence, so that the provided forward thrust is adjustable. In particular, the provided forward thrust should be adjustable such that no thrust is generated in hover of the rotorcraft 1 by the propeller 32 and that all energy is available for the tail rotor 22. Then, during forward flight of the rotorcraft 1, the propeller 32 receives essentially all power transferred via the drive train 33 and the tail rotor 22 is at least switched into a low-thrust mode.

Figure 16:
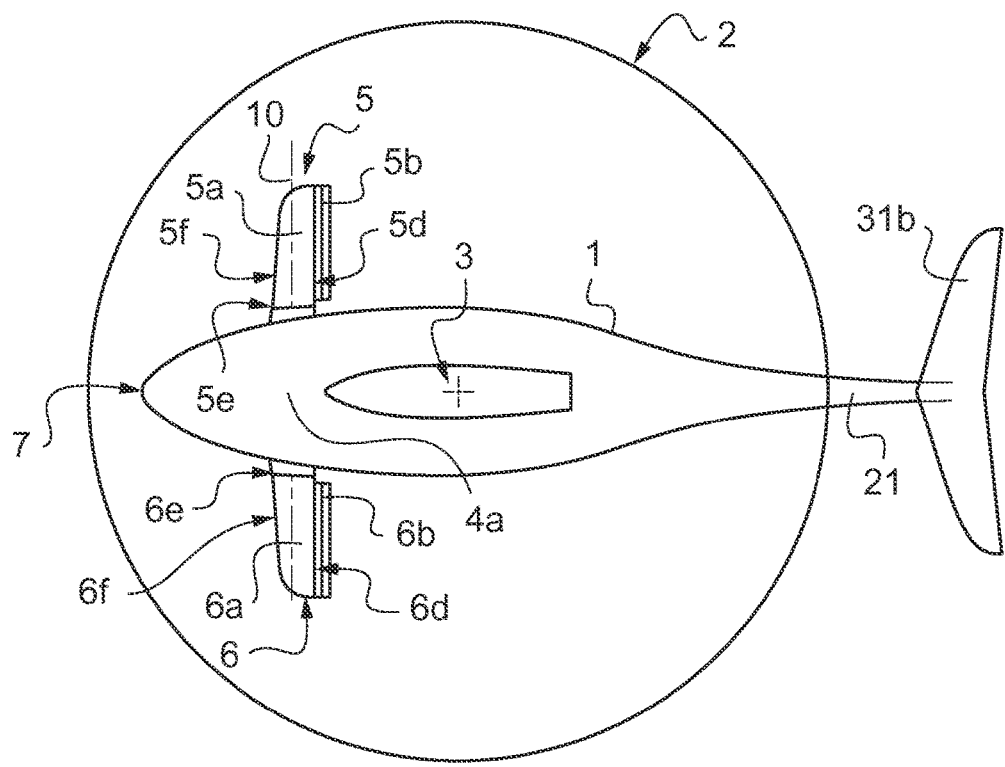
FIG. 16 shows a top view of the rotorcraft according to FIG. 15.

FIG. 16 shows the rotorcraft 1 of FIG. 15 with the passive wing-type aerodynamic devices 5, 6 having their main wings 5a, 6a connected to the fuselage 4 of FIG. 9 at the associated planar boundaries 5e, 6e, which are again positioned like in FIG. 9. Such an intermediate position of the interconnected main and auxiliary wings 6a, 6b reduces, for a given amount of lift generated by them, the pitching moment exerted on the fuselage 4, compared with the positioning closer to the nose 7 of FIG. 11 and FIG. 12.

FIG. 17 shows the rotorcraft 1 of FIG. 9 with the passive wing-type aerodynamic device 6, i.e. the interconnected main and auxiliary wings 6a, 6b of FIG. 4, which are again positioned like in FIG. 9. However, in contrast to FIG. 9, the rotorcraft 1 is now provided with the propeller 32 of FIG. 15 having the plurality of propeller blades 32a, which are now arranged in an associated propeller duct 32b in order to provide for enhanced safety, increased propeller efficiency, reduced noise emission and enhanced directional stability of the rotorcraft 1.

FIG. 18 shows the rotorcraft 1 of FIG. 17 with the passive wing-type aerodynamic devices 5, 6 having their main wings 5a, 6a connected to the fuselage 4 of FIG. 9 at the associated planar boundaries 5e, 6e, which are again positioned like in FIG. 9. However, as an alternative embodiment and in contrast to FIG. 9, the fin 31 is now provided with first and second fin elements 31c, 31d, which are illustratively arranged in V-form, which increases mechanical stiffness of the fin-wing-transition.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention, as for instance described below with reference to FIG. 19, FIG. 20, FIG. 21, FIG. 22 and FIG. 23. These figures show alternative passive wing-type aerodynamic devices that can be used with the rotorcraft 1 described above instead of the passive wing-type aerodynamic device 5, 6 described above. However, for brevity and conciseness, similar alternative passive wing-type aerodynamic devices that can be used instead of the passive wing-type aerodynamic device 5, 6 described above are not described hereinafter, as they readily result for a person skilled in the art from the following description.

Figure 19:
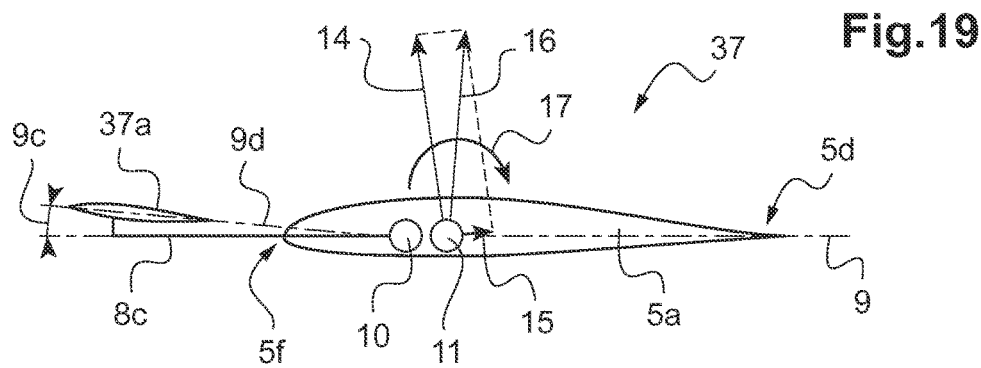
FIG. 19 shows a side view of a passive wing-type aerodynamic device according to a first alternative embodiment.

FIG. 19 shows a first alternative passive wing-type aerodynamic device 37 having, by way of example, the main wing 5a of FIG. 2. However, in contrast to FIG. 2, the main wing 5a is now connected by means of a wing connector 8c to an auxiliary wing 37a, which is positioned upstream of the main wing 5a, i.e. in front of its leading edge 5f instead of behind of its trailing edge 5d, and which defines together with the main wing 5a the combined neutral point 11 of FIG. 2.

More specifically, the auxiliary wing 37a is mounted with a predetermined angle of incidence 9c to the main wing 5a in order to generate an aerodynamic nose-up pitching moment around the combined neutral point 11 in operation of the rotorcraft 1 of FIG. 1. The predetermined angle of incidence 9c is illustratively encompassed between the chord line 9 of the main wing 5a and a chord line 9d of the auxiliary wing 37a, and can optionally be adjustable mechanically.

Figure 20:
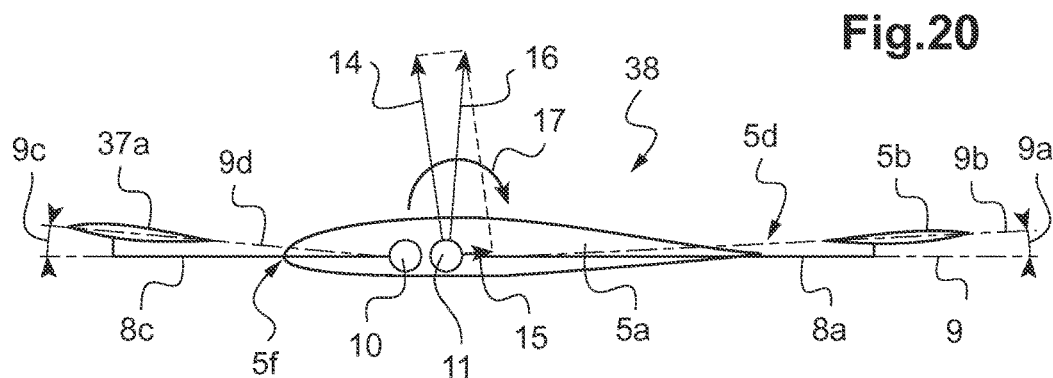
FIG. 20 shows a side view of a passive wing-type aerodynamic device according to a second alternative embodiment.

FIG. 20 shows a second alternative passive wing-type aerodynamic device 38 having, by way of example, the interconnected main and auxiliary wings 5a, 5b of FIG. 2. However, in contrast to FIG. 2, the main wing 5a is now further connected by means of the wing connector 8c of FIG. 19 to the auxiliary wing 37a of FIG. 19, which is again positioned upstream of the main wing 5a, i.e. at its leading edge 5f instead of its trailing edge 5d, with the predetermined angle of incidence 9c, which can optionally be adjustable mechanically. The auxiliary wing 37a defines together with the interconnected main and auxiliary wings 5a, 5b the combined neutral point 11 of FIG. 2, around which the interconnected main and auxiliary wings 5a, 5b, 37a generate an aerodynamic nose-up pitching moment in operation of the rotorcraft 1 of FIG. 1.

Figure 21:
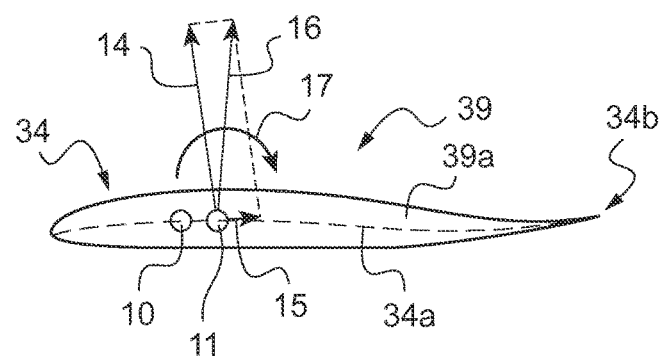
FIG. 21 shows a side view of a passive wing-type aerodynamic device according to a third alternative embodiment.

FIG. 21 shows a third alternative passive wing-type aerodynamic device 39, which illustratively comprises only a single wing element 39a. This single wing element 39a preferably comprises an S-shaped section profile 34 that is defined by an at least approximately S-shaped center line 34a, and that defines an upward bended trailing edge 34b and the combined neutral point 11 of FIG. 2. This upward bended trailing edge 34b is adapted to generate an aerodynamic nose-up pitching moment around the combined neutral point 11 in operation of the rotorcraft 1 of FIG. 1, so that provision of an auxiliary wing as described above can be omitted.

It should be noted that the S-shaped center line 34a is defined by an at least approximately identical distance from upper and lower surfaces of the single wing element 39a. Furthermore, the S-shaped center line 34a comprises an inflection point.

In an alternative embodiment of the wing-type aerodynamic devices illustrated in FIG. 19 and FIG. 20, the auxiliary wing 37a of FIG. 19 or FIG. 20 can be substituted by the passive wing-type aerodynamic device 5, 6 or at least the main wings 5a, 6a described above. The element 37a, which thus becomes a passive-wing type aerodynamic device itself, is hereinafter referred to as a "subordinate passive-wing type aerodynamic device".

Such a subordinate passive wing-type aerodynamic device can be connected to the main wing 5a of FIG. 19 or FIG. 20 e.g. by means of the connector 8c. Thereby, the sub-ordinate passive aerodynamic device is mounted to the front end of connector 8c such as to allow its essentially sticking friction free rotation about an associated rotation axis.

The subordinate passive wing-type aerodynamic device is adopted to generate lift in approximately the same direction as the lift 14 of the complete passive wing-type aerodynamic device 37 of FIG. 19 or 38 of FIG. 20. In analogy to the forces 14a and 15a transferred by the passive wing-type aerodynamic device 6 to the rotorcraft 1 of FIG. 4, the subordinate passive wing-type aerodynamic device would also transfer a constant lift and a drag force to the connector 8c that is essentially independent of the rotational position of the main wing 5a of FIG. 19 or FIG. 20. Therefore, the moment generated by the subordinate passive wing-type aerodynamic device about the combined neutral point 11 of FIG. 19 or FIG. 20 is also essentially independent of the angle of attack 13 illustrated in FIG. 2, if the angle of attack 13 is small, which is the normal operating condition. This is in contrast to the embodiment with the front auxiliary wing connected rigidly to the connector 8c, where the nose-up moment generated by the auxiliary wing about the neutral point 11 increases with increasing angle of attack 13.

The purpose of fitting a subordinate passive wing-type aerodynamic device instead of a fixed front auxiliary wing therefore is to provide a stronger restoring moment in case that the moment equilibrium about the rotational axis 10, at which the main wing 5a is connected to the rotorcraft 1, is perturbed. In case of a nose-up perturbation, by which the angle of attack 13 of FIG. 2 is enlarged compared to an equilibrium situation, the restoring nose-down moment about the rotational axis 10, which determines the return of the complete passive wing-type aerodynamic device 37 of FIG. 19 or 38 of FIG. 20 to the equilibrium rotational orientation, is larger when fitting a subordinate passive wing-type aerodynamic device instead of a fixed front auxiliary wing. This behavior is achieved because the subordinate device does not generate an increasing nose-up moment but a constant moment, as described above. Vice versa, in case of a nose-down perturbation a stronger nose-up restoring moment is achieved when fitting the subordinate device. Accordingly, the response of the complete passive wing-type aerodynamic device 37 of FIG. 19 or 38 of FIG. 20 to changes in the direction of the incoming flow 12 of FIG. 2 can also be improved.

Figure 22:
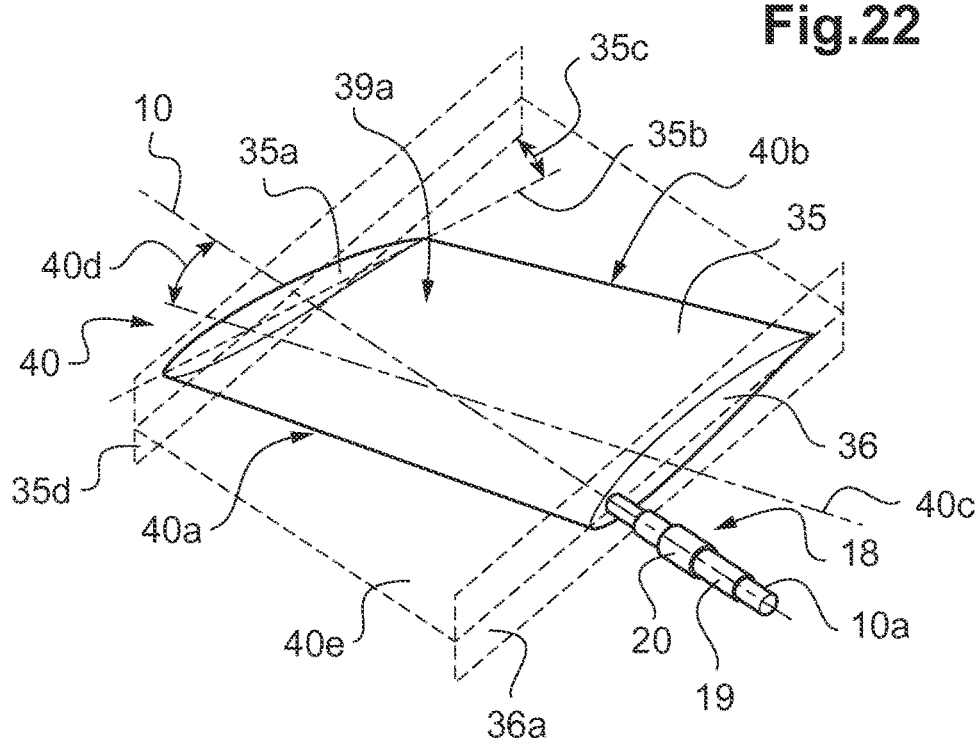
FIG. 22 shows a perspective view of a passive wing-type aerodynamic device according to a fourth alternative embodiment.

FIG. 22 shows a fourth alternative passive wing-type aerodynamic device 40, which illustratively comprises the wing element 5a of FIG. 3. Alternatively it may comprise the wing element 39a of FIG. 21. The wing element 39a or 5a is now embodied as a swept wing 35 with spanwise twist and forward sweep.

More specifically, the swept wing 35 has a leading edge 40a and a trailing edge 40b. Furthermore, the swept wing 35 comprises an outer wing section 35a that defines an outer wing section chord line 35b and an outer section plane 35d, and an inner wing section 36, which is by way of example connected to the bearing arrangement 18 of FIG. 3 and that defines an inner section plane 36a. The outer and inner section planes 35d, 36a are illustratively parallel to each other. A reference plane 40e contains a quarter chord line 40c, and a chord line of the inner wing section 36 that is not designated explicitly for simplicity and clarity of the drawings. The quarter chord line 40c is defined by corresponding quarter chord points of the outer and inner wing sections 35a, 36. Said forward sweep is defined by an angle 40d between the quarter chord line 40c and the rotation axis 10 of the passive wing-type aerodynamic device, with the quarter chord point of the outer wing section 35a assuming a longitudinal position forward of the quarter point of the inner wing section 36.

Preferably, the outer wing section chord line 35b encompasses an outer wing section twist angle 35c with the reference plane 40e. This outer wing section twist angle 35c is defined such that the leading edge 40a at the outer wing section 35a is positioned—in FIG. 22—above the reference plane 40e, while the trailing edge 40b at the outer wing section 35a is positioned—in FIG. 22—below the reference plane 40e. Accordingly, the outer wing section 35a of the swept wing 35 is twisted nose-up relative to its inner wing section 36.

Figure 23:
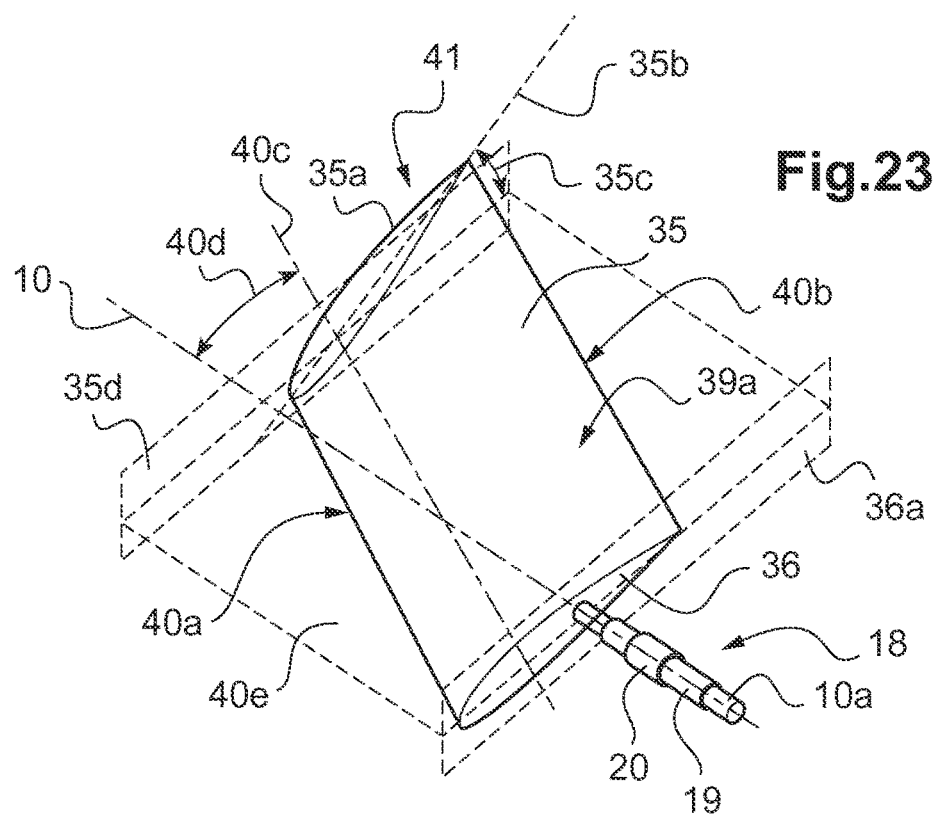
FIG. 23 shows a perspective view of a passive wing-type aerodynamic device according to a fifth alternative embodiment.

FIG. 23 shows a fifth alternative passive wing-type aerodynamic device 41, which is an alternative embodiment of the swept wing 35 with spanwise twist of FIG. 22. However, in contrast to FIG. 22, the swept wing 35 now comprises back- or rearward sweep. Said rearward sweep is defined by an angle 40d between the quarter chord line 40c and the rotation axis 10 of the passive wing-type aerodynamic device, with the quarter chord point of the outer wing section 35a now assuming a longitudinal position rearward of the quarter point of the inner wing section 36.

More specifically, in contrast to FIG. 22, the outer wing section twist angle 35c is now defined such that the leading edge 40a at the outer wing section 35a is positioned—in FIG. 23—below the reference plane 40e, while the trailing edge 40b at the outer wing section 35a is positioned—in FIG. 23—above the reference plane 40e. Accordingly, the outer wing section 35a of the swept wing 35 is now twisted nose-down relative to its inner wing section 36.

Although FIGS. 22 and 23 show the realization of a passive wing-type aerodynamic device with a single swept and twisted wing, an embodiment where at least one auxiliary wing 5b or 37a of FIG. 20 are additionally connected to the single swept wing 35 of FIG. 22 or FIG. 23 is also considered.

Finally, it should be noted that further modifications are also within the common knowledge of the person skilled in the art and, thus, also considered as being part of the present invention. For instance, the passive wing-type aerodynamic devices 5, 6 of FIG. 1 can be mounted to the rotorcraft 1 of FIG. 1 with their rotation axis 10 of FIG. 2 oriented vertically. In this configuration, a lateral force and a yawing moment about the center of gravity 23 of FIG. 4 would be generated by the interconnected main and auxiliary wings 5a, 5b, 6a, 6b of FIG. 1 in forward flight of the rotorcraft 1 independent of a respective yaw angle of the rotorcraft 1 of FIG. 1. In lateral flight, no sideward drag would be generated. Therefore, the interconnected main and auxiliary wings 5a, 5b, 6a, 6b of FIG. 1 with vertically oriented rotation axes could be used advantageously as a support to an underlying anti-torque system, which does not raise difficulties with lateral drag in lateral flight. In this case, fixed vertical control surfaces, such as the fin 31 in FIG. 9 would, however, still be necessary to provide directional stability of the rotorcraft 1 of FIG. 1.

REFERENCE LIST 1 rotorcraft
1a, 1b lateral rotorcraft sides
2 main rotor
2a, 2b, 2c, 2d rotor blades
2f rotor mast
3 main rotor center
3a rotor mast axis
4 fuselage
5, 6 passive wing-type aerodynamic devices
5a, 6a main wings
5b, 6b auxiliary wings
5c, 6c main wing endplates
5d, 6d main wing trailing edges
5e, 6e planar boundaries
5f, 6f main wing leading edges
7 fuselage nose
8a, 8b, 8c wing connectors 9 main wing chord line
9a, 9c angles of incidence
9b, 9d auxiliary wing chord lines
10 main wing rotation axis
10a main wing rotary shaft
11 combined neutral point
12 air flow direction
13 angle of attack
14 lift force
14a transferred lift force
15 drag force
15a transferred drag force
16 total force
16a total force vector line
16b transferred total force
17 aerodynamic pitching moment
18 bearing arrangement
19 intermediate bearing ring
20 outer bearing ring
21 tail boom
22 tail rotor
23 center of gravity
23a gravity center line
24 lift force moment arm
25 drag force moment arm
26 minimum pitch moment change position
27 rotor downwash
28 hover lift force
29 horizontal stabilizer
29a downward force
29b upward force
30 horizontal level
30a flight direction
31 fin
31a rudder
31b tail wing
31c, 31d first and second fin elements
32 propeller
32a propeller blades
32b propeller duct
33 drive train
34 S-shaped section profile
34a S-shaped center line
34b upward bended trailing edge
35 swept wing
35a outer wing section
35b outer wing section chord line
35c outer wing section twist angle
35d outer section plane
36 inner wing section
36a inner section plane
37, 38, 39, 40, 41 alternative wing-type devices
39a swept wing element
37a upstream auxiliary wing
40a swept wing leading edge
40b swept wing trailing edge
40c quarter chord line
40d sweep angle
40e reference plane

What is claimed is:

1. A rotorcraft with a fuselage comprising a nose and with at least one main rotor suitable for rotating around a rotor mast axis, the rotorcraft assuming varying pitch attitudes in operation, and the fuselage being equipped with at least one passive wing-type aerodynamic device that is adapted for generating independently of the varying pitch attitudes a lift force acting on the fuselage, the lift force being oriented perpendicular to an air flow that is directed in operation of the rotorcraft against the passive wing-type aerodynamic device wherein the passive wing-type aerodynamic device comprises at least one wing element that is rotatable relative to the fuselage around an associated rotation axis, the at least one wing element being adapted to self-adjust its rotational orientation relative to the fuselage by rotating in reaction to the air flow, wherein the at least one wing element is positioned longitudinally closer to the nose of the fuselage than the rotor mast axis, and wherein at least one wing element comprises a combined neutral point designating a location, where a derivative of an aerodynamic pitching moment generated in operation of the rotorcraft is zero with respect to changes in an angle of attack encompassed between the air flow, that is directed in operation of the rotorcraft against the at least one wing element, and a chord line of the at least one wing element, wherein the associated rotation axis is arranged relative to the air flow at a position located upstream of the combined neutral point, if the aerodynamic pitching moment tends to increase the angle of attack.

2. The rotorcraft according to claim 1, wherein at least one wing element is at least weight-balanced about the associated rotation axis, such that aerodynamic loads occurring in operation of the rotorcraft on the at least one wing element determine the angle of attack at least substantially.

3. The rotorcraft according to claim 1, wherein at least one wing element is rotatably mounted to the fuselage by means of a bearing arrangement that is adapted to allow at least substantially static-friction-free rotation of the at least one wing element relative to the fuselage.

4. The rotorcraft according to claim 3, wherein at least one wing element is equipped with a rotary shaft, wherein the bearing arrangement comprises an intermediate bearing ring that is rotatably mounted to the rotary shaft and an outer bearing ring holding the intermediate bearing ring, the intermediate bearing ring being adapted for continuous rotation or oscillation around the rotary shaft, and the outer bearing ring being non-rotatably mounted to the fuselage.

5. The rotorcraft according to claim 3, wherein the bearing arrangement comprises at least one ball bearing with spherical ball races.

6. The rotorcraft according to claim 1, wherein at least one wing element comprises a main wing and at least one auxiliary wing, the at least one auxiliary wing being mounted with a predetermined angle of incidence to the main wing by means of an associated wing connector, the predetermined angle of incidence being encompassed between a chord line of the main wing and a chord line of the at least one auxiliary wing.

7. The rotorcraft according to claim 6, wherein the predetermined angle of incidence is mechanically adjustable.

8. The rotorcraft according to claim 6, wherein at least one auxiliary wing is mounted at a position located upstream or downstream of the main wing relative to the air flow that is directed in operation of the rotorcraft against the main wing.

9. The rotorcraft according to claim 6, wherein at least one auxiliary wing is mounted to the main wing at a predetermined distance downstream a trailing edge of the main wing.

10. The rotorcraft according to claim 1, wherein at least one wing element is equipped with at least one winglet-like endplate.

11. The rotorcraft according to claim 1, wherein at least one wing element comprises a S-shaped section profile.

12. The rotorcraft according to claim 1, wherein at least one wing element is embodied as a swept wing with spanwise twist, the swept wing comprising an outer wing section that is twisted nose-up in case of forward sweep, or twisted nose-down in case of rearward sweep, relative to an associated inner wing section.

13. The rotorcraft according to claim 1, wherein at least one wing element comprises a first wing element arranged on a first lateral rotorcraft side and a second wing element arranged on a second lateral rotorcraft side, the first and second wing elements being adapted to operate independently or in unison.

14. The rotorcraft according to claim 13, wherein the first and second wing elements comprise differing wingspans.

15. The rotorcraft according to claim 1, wherein the main rotor is configured to be drivable with a variable rotational speed.

16. The rotorcraft according to claim 1, wherein a propeller is provided.

17. A rotorcraft with a fuselage comprising a nose and with at least one main rotor suitable for rotating around a rotor mast axis, the rotorcraft assuming varying pitch attitudes in operation, and the fuselage being equipped with at least one passive wing-type aerodynamic device that is adapted for generating independently of the varying pitch attitudes a lift force acting on the fuselage, the lift force being oriented perpendicular to an air flow that is directed in operation of the rotorcraft against the passive wing-type aerodynamic device wherein the passive wing-type aerodynamic device comprises at least one wing element that is rotatable relative to the fuselage around an associated rotation axis, the at least one wing element being adapted to self-adjust its rotational orientation relative to the fuselage by rotating in reaction to the air flow, wherein the at least one wing element is positioned longitudinally closer to the nose of the fuselage than the rotor mast axis, and wherein at least one wing element is at least weight-balanced about the associated rotation axis, such that aerodynamic loads occurring in operation of the rotorcraft on the at least one wing element determine the angle of attack at least substantially.

18. The rotorcraft according to claim 17, wherein at least one wing element is rotatably mounted to the fuselage by means of a bearing arrangement that is adapted to allow at least substantially static-friction-free rotation of the at least one wing element relative to the fuselage.

19. The rotorcraft according to claim 18, wherein at least one wing element is equipped with a rotary shaft, wherein the bearing arrangement comprises an intermediate bearing ring that is rotatably mounted to the rotary shaft and an outer bearing ring holding the intermediate bearing ring, the intermediate bearing ring being adapted for continuous rotation or oscillation around the rotary shaft, and the outer bearing ring being non-rotatably mounted to the fuselage.

20. The rotorcraft according to claim 17, wherein at least one wing element comprises a main wing and at least one auxiliary wing, the at least one auxiliary wing being mounted with a predetermined angle of incidence to the main wing by means of an associated wing connector, the predetermined angle of incidence being encompassed between a chord line of the main wing and a chord line of the at least one auxiliary wing.

* * * * *